(12) United States Patent
Fukunaka et al.

(10) Patent No.: US 10,545,949 B2
(45) Date of Patent: Jan. 28, 2020

(54) DATA MANAGEMENT SYSTEM AND DATA MANAGEMENT METHOD

(71) Applicant: Hitachi, Ltd., Tokyo (JP)

(72) Inventors: Katsuhiro Fukunaka, Tokyo (JP); Nobuyuki Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 423 days.

(21) Appl. No.: 15/125,715

(22) PCT Filed: Jun. 3, 2014

(86) PCT No.: PCT/JP2014/064739
§ 371 (c)(1),
(2) Date: Sep. 13, 2016

(87) PCT Pub. No.: WO2015/186191
PCT Pub. Date: Dec. 10, 2015

(65) Prior Publication Data
US 2017/0011086 A1 Jan. 12, 2017

(51) Int. Cl.
*G06F 16/23* (2019.01)
*G06F 16/22* (2019.01)
*G06F 16/248* (2019.01)

(52) U.S. Cl.
CPC .......... *G06F 16/2365* (2019.01); *G06F 16/22* (2019.01); *G06F 16/248* (2019.01)

(58) Field of Classification Search
CPC .... G06F 17/30371; G06F 11/20; G06F 12/00; G06F 17/30312; G06F 17/30554
See application file for complete search history.

(56) References Cited

U.S. PATENT DOCUMENTS

| 5,261,085 A | 11/1993 | Lamport |
| 2002/0143724 A1* | 10/2002 | Corl, Jr. .................. H04L 41/16 |

(Continued)

OTHER PUBLICATIONS

Francisco Brasileiro et al., "Consensus in One Communication Step", Parallel Computing Technologies, Springer Berlin Heidelberg, 2001, pp. 42-50.

(Continued)

*Primary Examiner* — Ashish Thomas
*Assistant Examiner* — Dustin D Eyers
(74) *Attorney, Agent, or Firm* — Mattingly & Malur, PC

(57) ABSTRACT

A data management system including a plurality of servers each having a processor, a memory, and a storage device, the system receiving and storing data using the plurality of servers and multiplexing the data, wherein the servers are provided with: a first determination unit that determines the consistency of the multiplexed data; a second determination unit that has a greater number of allowable server failures than the first determination unit for determining the consistency of the multiplexed data but a greater minimum number of times of server-to-sever communications for determining the consistency of the data; a combination unit that receives a data consistency determination result from the first determination unit or the second determination unit, and that, if the determination result includes consistency guaranteeing data, outputs the consistency guaranteed data; and a data storage unit that stores the data output by the combination unit.

10 Claims, 15 Drawing Sheets

(56) References Cited

U.S. PATENT DOCUMENTS

| | | | |
|---|---|---|---|
| 2004/0025079 A1* | 2/2004 | Srinivasan | H04L 67/1095 |
| | | | 714/13 |
| 2005/0108298 A1* | 5/2005 | Iyengar | G06F 17/30215 |
| 2005/0114286 A1* | 5/2005 | Bai | H04L 69/40 |
| 2009/0240974 A1* | 9/2009 | Baba | G06F 11/2028 |
| | | | 714/4.1 |
| 2010/0262717 A1* | 10/2010 | Critchley | H04L 12/42 |
| | | | 709/251 |
| 2011/0004521 A1* | 1/2011 | Behroozi | G06F 7/24 |
| | | | 705/14.54 |
| 2011/0145830 A1* | 6/2011 | Yamaguchi | G06F 9/5027 |
| | | | 718/104 |
| 2013/0073865 A1* | 3/2013 | Kornafeld | H04L 9/3231 |
| | | | 713/189 |
| 2014/0006458 A1* | 1/2014 | Hsieh | G06F 17/30292 |
| | | | 707/803 |

OTHER PUBLICATIONS

Michael Ben-Or, "Another Advantage of Free Choice: Completely Asynchronous Agreement Protocols (Extended Abstract)", PODC '83 Proceedings of the second annual ACM symposium on Principles of distributed computing: 1983, pp. 27-30).
International Search Report of PCT/JP2014/064739 dated Oct. 21, 2014.

* cited by examiner

| PRIORITY (2401) | CHARACTERISTICS (2402) |
|---|---|
| 1 | DECISION VALUE IN ANY ONE OF PROCESS-SAVING 1-STEP ALGORITHM AND 2-STEP ALGORITHM (FULLY MATCHING 3/4 OF INPUTS IN PROCESS-SAVING 1-STEP AND FULLY MATCHING 1/2 OF SECOND-STAGE INPUTS IN 2-STEP) |
| 2 | VALUE OF PARTIALLY MATCHING 1/2 OF SECOND-STAGE INPUTS IN 2-STEP ALGORITHM |
| 3 | VALUE OF MATCHING MAJORITY OF 1/2 OF INPUTS IN PROCESS-SAVING 1-STEP ALGORITHM |
| 4 | RESOLUTION VALUE IN ANY ONE OF PROCESS-SAVING 1-STEP ALGORITHM AND 2-STEP ALGORITHM |

*FIG. 4*

| ALGORITHM NAME (3001) | NUMBER n OF NECESSARY PROCESSES (3002) | NUMBER e OF ALLOWABLE FAILURES THAT CAN MAINTAIN MINIMUM NUMBER OF TIMES OF COMMUNICATIONS (3003) | MINIMUM NUMBER δ OF TIMES OF COMMUNICATIONS BETWEEN CLIENT AND CONSENSUS (3004) |
|---|---|---|---|
| PAXOS | n = 2f+1 | e < n/2 | δ = 3 |
| 1-STEP | n = 3f+1 | e < n/3 | δ = 2 |
| PROCESS-SAVING 1-STEP | n = 2f+1 | e <= n/4 | δ = 2 |
| 2-STEP | n = 2f+1 | e < n/2 | δ = 3 |
| PROCESS-SAVING 1-STEP & 2-STEP | n = 2f+1 | e < n/2 | δ = 2 |

*FIG. 5*

DATA MANAGEMENT SYSTEM AND DATA MANAGEMENT METHOD

BACKGROUND

This invention relates to a computer system configured to store data in a plurality of servers and replicate the data to ensure availability.

In a distributed data management system, e.g., a distributed in-memory key value store (KVS), in order to prevent data from being lost when a failure occurs in a server, the data is stored in a plurality of servers in a distributed manner to ensure availability.

There is known a method of using a distributed consensus algorithm (for example, U.S. Pat. No. 5,261,085 B2) to guarantee consistency of data in replication for storing data in a plurality of servers. In a Paxos algorithm (hereinafter referred to as "PAXOS") disclosed in U.S. Pat. No. 5,261,085 B2, original data is stored in a master computer as a master, and replicated data is handled as a slave and is stored in a plurality of slave computers.

In PAXOS, the following expression is satisfied in order to guarantee the consistency of the replicated data.

(number $n$ of processes)=$2f+1$ where f represents the number of pieces of data to be replicated, and the number n of processes represents the number of computers storing the data. According to the above-mentioned expression, communications need to be conducted between the (master and slave) computers at least twice, and a number e of allowable failures is smaller than n/2. The number e of allowable failures represents the number of processes (computers) that can maintain a minimum number of times of communications (latency) even when a failure occurs. Further, the latency is set as a minimum number δ of times of communications exhibited after a client requests the master computer to update (or refer to) the data before the consensus is reached on the slave computer (consistency of the data is guaranteed).

In Paxos, a failure and a delay in a part of the slave computer storing the slave can be concealed, but a failure or a delay in the master computer cannot be concealed. Hence, there is a problem in that, in the distributed data management system that demands a low latency at all times, the latency increases due to an increase in the number of times of communications at an occurrence of a failure.

In view of the foregoing, there is proposed a technology for eliminating a master-and-slave relationship, transmitting data to respective computers, transmitting and receiving the data received by the respective computers to/from one another, and determining a degree of an identity of a value of the data transmitted and received by the respective computers to/from one another, to thereby ensure the latency while guaranteeing the consistency (for example: Francisco Brasileiro, Fabiola Greve, Achour Mostefaoui, and Michel Raynal, 2001, Consensus In One Communication Step, "Parallel Computing Technologies", pp. 42-50, Springer Berlin Heidelberg; and Michael Ben-Or, 1983, Another Advantage of Free Choice: Completely Asynchronous Agreement Protocols (Extended Abstract), PODC '83 Proceedings of the second annual ACM symposium on Principles of distributed computing: pp. 27-30).

SUMMARY

However, in Francisco Brasileiro, Fabiola Greve, Achour Mostefaoui, and Michel Raynal, 2001, Consensus In One Communication Step, "Parallel Computing Technologies", pp. 42-50, Springer Berlin Heidelberg according to the related art, the low latency is achieved while guaranteeing consistency of data by increasing the number of necessary processes compared with Paxos. Therefore, it is possible to reduce the number of times of communications conducted before the consensus is reached, but there are problems in that the number of processes increases to n=3f+1 and that a number e of allowable failures that can maintain a minimum number of times of communications decreases to smaller than n/3. There is also a problem in that a failure or a delay in a master computer cannot be concealed in Paxos.

Therefore, this invention has been made in view of the above-mentioned problems, and has an object to reduce the number of times of communications conducted after a server is requested to update (or refer to) data before consistency of the data is guaranteed while suppressing an increase in a scale of servers (or number of processes).

A representative aspect of this invention is as follows. A data management system, comprising a plurality of servers comprising a processor, a memory, and a storage apparatus, the data management system being configured to receive and store data by the plurality of servers and to replicate and hold the data, the plurality of servers each comprising: a first determination module configured to determine a degree of consistency of the replicated data; a second determination module having a larger number of allowable failures in each of the plurality of servers than the first determination module when the degree of the consistency of the replicated data is determined and having a larger minimum number of times of communications conducted between the plurality of servers in order to determine the degree of the consistency of the data; a combination module configured to receive a determination result of the degree of the consistency of the data from one of the first determination module and the second determination module, and to output the data guaranteed to have the consistency when the determination result includes data for guaranteeing the consistency; and a data storage module configured to store the data output by the combination module.

According to this invention, it is possible to reduce the number of times of communications conducted after the data is received before the consistency of the data is guaranteed while suppressing the increase in the scale of the server (number of processes) and suppressing reduction in the number of allowable failures in the server.

BRIEF DESCRIPTION OF THE DRAWINGS

FIG. 4 is a table for showing priorities for selecting the consensus algorithms according to the first embodiment of this invention.

FIG. 5 is a table for comparison of performance of the respective consensus algorithms according to the first embodiment of this invention.

DETAILED DESCRIPTION OF THE PREFERRED EMBODIMENTS

Embodiments of this invention are described below with reference to the accompanying drawings.

First Embodiment

Figure 1:
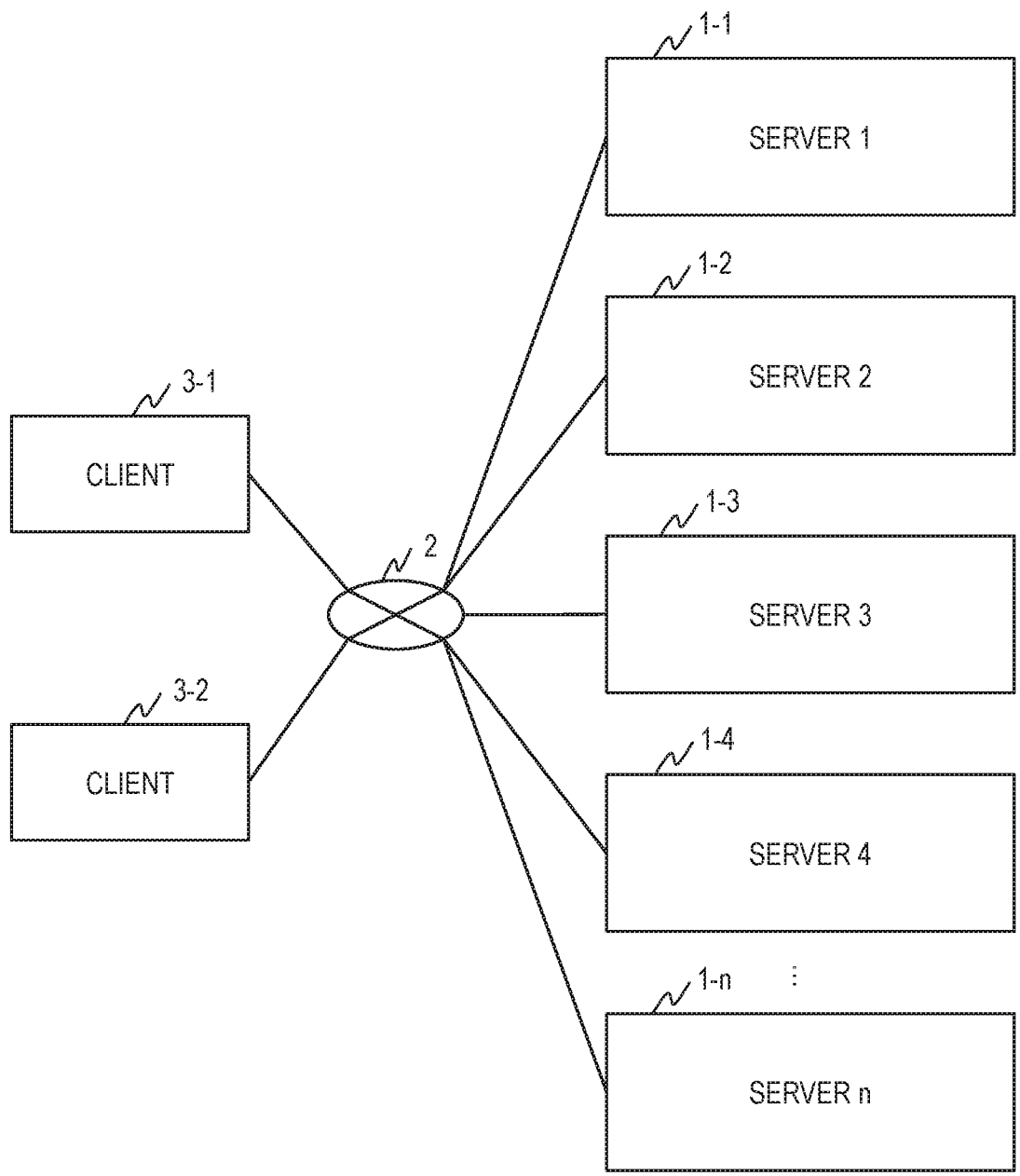
FIG. 1 is a block diagram for illustrating an example of a computer system configured to conduct distributed data management according to a first embodiment of this invention.

FIG. 1 is a block diagram for illustrating an example of a computer system configured to conduct distributed data management. Servers 1-1 to 1-$n$ are coupled to clients 3-1 and 3-2 through a network 2. The servers 1-1 to 1-$n$ form a distributed data management system for storing data received from the clients 3-1 and 3-2 in a distributed manner. In the following description, the servers 1-1 to 1-$n$ are generically represented by the server 1, and the clients 3-1 and 3-2 are generically represented by the client 3.

Figure 2:
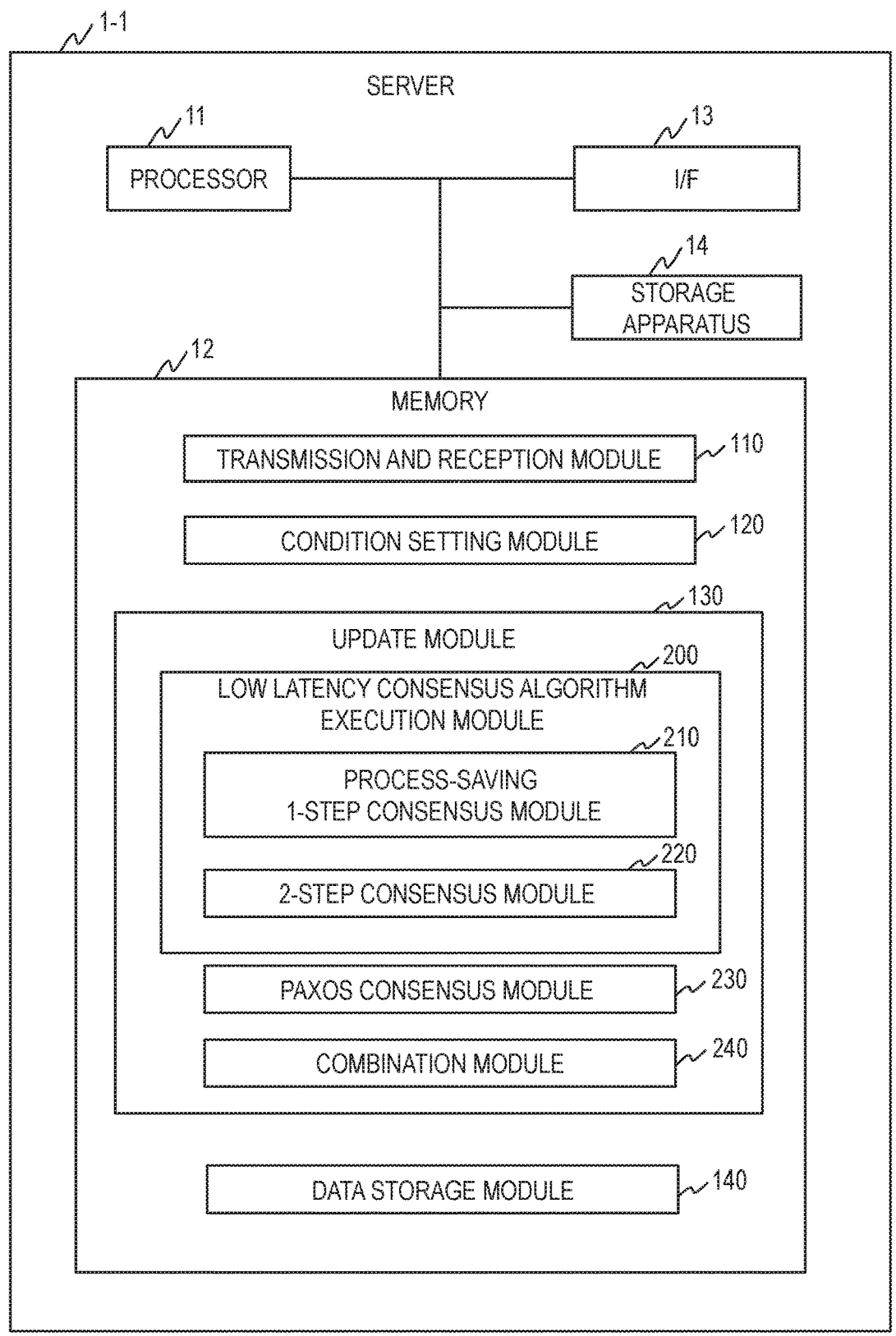
FIG. 2 is a block diagram for illustrating an example of a configuration of a server according to the first embodiment of this invention.

FIG. 2 is a block diagram for illustrating an example of a configuration of the server 1-1. The servers 1-2 to 1-$n$ have the same configuration, and hence a duplicate description is omitted. The server 1-1 is a computer including a processor 11 configured to conduct arithmetic calculation, a memory 12 configured to hold a program and data, a storage apparatus 14 configured to store data and a program, and an interface 13 coupled to the network 2 and configured to conduct communications.

The memory 12 holds a transmission and reception module 110 configured to transmit and receive data through the interface 13, an update module 130 configured to determine a degree of an identity (consistency) between the received data and data of other servers 1, and a data storage module 140 configured to store data output by the update module 130. The data storage module 140 may be set in the storage apparatus 14, or may be set in both the storage apparatus 14 and the memory 12.

In order to determine the degree of the identity between the received data and the data of the other servers 1, the update module 130 includes: a low latency consensus algorithm execution module 200 including a process-saving 1-step consensus module 210 configured to execute a process-saving 1-step consensus algorithm and a 2-step consensus module 220 configured to execute a 2-step consensus algorithm; a PAXOS consensus module 230 configured to execute PAXOS as an auxiliary consensus algorithm; and a combination module 240 configured to combine outputs of the process-saving 1-step consensus module 210 and the 2-step consensus module 220 to output a decision value guaranteed to have the consistency.

The respective functional modules, which include: the transmission and reception module 110; and the process-saving 1-step consensus module 210, the 2-step consensus module 220, the PAXOS consensus module 230, and the combination module 240 that form the update module 130, are loaded into the memory 12 as programs.

The processor 11 conducts processing in accordance with the program of each functional module, to thereby operate as a functional module configured to provide a predetermined function. For example, the processor 11 conducts processing in accordance with a transmission and reception program, to thereby function as the transmission and reception module 110, and conducts processing in accordance with a combination program, to thereby function as the combination module 240. The same applies to the other programs. The processor 11 also operates as functional modules configured to provide respective functions of a plurality of pieces of processing executed by the respective programs. The computer and the computer system are an apparatus and a system that include those functional modules.

The programs for achieving the respective functions of the server 1-1 and information including tables can be stored in a storage device, e.g., the storage apparatus 14, a non-volatile semiconductor memory, a hard disk drive, or a solid state drive (SSD), or in a computer-readable non-transitory data recording medium, e.g., an IC card, an SD card, or a DVD.

When receiving an update request for data from the client 3, the transmission and reception module 110 transmits the data received by the server 1-1 to other servers 1-2 to 1-$n$. After that, the transmission and reception module 110 receives the data within the update request transmitted from half of all the servers 1-2 to 1-$n$, and transmits the received data to the update module 130, and the update module 130 determines the degree of the identity of the data.

Then, the update module 130 outputs the data guaranteed to have the consistency with the data of the other servers 1, and writes the data to the data storage module 140. When completing the writing, the update module 130 transmits a response of update completion to the client 3 to bring update processing to an end.

The client 3 has a configuration of a computer including a processor (not shown), a memory (not shown), an interface (not shown), and a storage apparatus (not shown). The client 3 is configured to execute an application that requests the server 1 to register data, update data, and refer to data.

Next, a configuration of the update module 130 is described. As described above, the data received from the client 3 by the transmission and reception module 110 and the data of the client 3 received by the other servers 1 are input to the update module 130.

The update module 130 inputs those pieces of data to each of the process-saving 1-step consensus module 210 (first determination module) and the 2-step consensus module 220 (second determination module), and executes determination of the degree of the identity (or consistency) of the data.

The process-saving 1-step consensus module 210 outputs a decision value, an estimation value, or a resolution value as a determination result of the degree of the identity. The 2-step consensus module 220 outputs a decision value, an estimation value, or a resolution value as a determination result of the degree of the identity. The combination module 240 inputs those decision values, estimation values, or resolution values.

When determining that the data received from the client 3 is the same as the data of the client 3 transmitted to the other servers 1, the combination module 240 outputs the input data to the data storage module 140 as a decision value (consensus value) guaranteed to have the consistency. The decision value is data guaranteed to have the identity (or consistency). The consensus value is data having a consensus obtained with the other servers 1 in terms of identity, and is guaranteed to have the consistency between the servers 1.

Meanwhile, when the decision value is not obtained, the combination module 240 inputs the estimation value or the data (resolution value) received from the client 3 to the PAXOS consensus module 230 (third determination module or auxiliary consensus module), and communicates to/from the PAXOS consensus modules 230 of the other servers 1 to arithmetically operate the decision value. Then, the update module 130 acquires the decision value of the PAXOS consensus module 230, and outputs the decision value as the consensus value.

The update module 130 stores the consensus value output by the combination module 240 or the PAXOS consensus module 230 in the data storage module 140, and transmits the response indicating that the data has been updated to the client 3-1.

<Process-Saving 1-Step Consensus Module>

Figure 15:
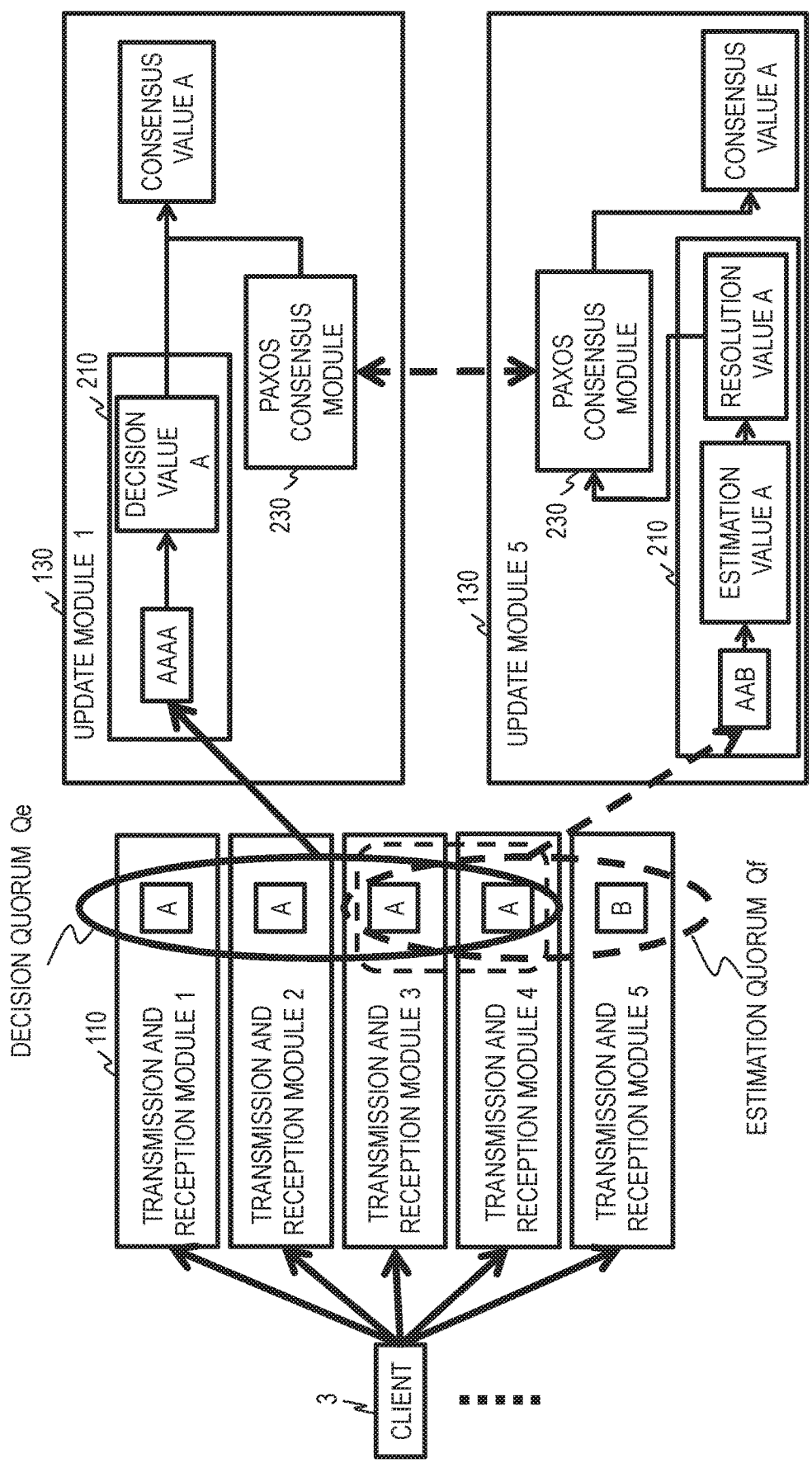
FIG. 15 is a block diagram for illustrating an example of the process-saving 1-step consensus module according to the first embodiment of this invention.

FIG. 15 is a block diagram for illustrating an example of the process-saving 1-step consensus module 210. The determination of the degree of the identity (consistency) of data and a resolution method for a case where the identity is not guaranteed (hereinafter referred to as "collision"), which are conducted in accordance with the process-saving 1-step consensus algorithm, are the same as those of a 1-step consensus algorithm disclosed in Francisco Brasileiro, Fabiola Greve, Achour Mostefaoui, and Michel Raynal, 2001, Consensus In One Communication Step, "Parallel Computing Technologies", pp. 42-50, Springer Berlin Heidelberg, which is as follows.

Identity of data: decision values always match.

Resolution of collision: when a decision value is likely to exist in any one of the servers 1, an estimation value always matches the decision value. (When a decision value is likely to exist in any one of the servers 1, an estimation value matching the decision value always exists, and becomes a resolution value (estimation value)). Otherwise, the resolution value matches an arbitrary one of values of input data (or suggestion).

FIG. 15 is an illustration of an example in which the respective transmission and reception modules 110 of the servers 1-1 to 1-5 of FIG. 1 are set as transmission and reception modules 1 to 5 and the update modules 130 of the servers 1-1 and 1-5 are set as update modules 1 and 5. In the illustrated example, the transmission and reception modules 1 to 4 receive the data "A" from the client 3, and the transmission and reception module 5 receives the data "B" from the client 3.

In the illustrated example, the process-saving 1-step consensus module 210 configured to execute the process-saving 1-step consensus algorithm divides the transmission and reception modules 1 to 5 into two quorums of a decision quorum and an estimation quorum, and obtains the degrees of identities of the data within the respective quorums by consensuses of the update module 1 and the update module 5. The quorum represents a partial set of elements involved in execution of distributed processing.

Next, the number of transmission and reception modules 110 (servers 1) that define the decision quorum is represented by Qe, and the number of transmission and reception modules 110 (servers 1) that define the estimation quorum is represented by Qf.

Referring to the above-mentioned requirement for the identity of the data, arbitrary decision quorums need to always overlap each other, and $Qe > n/2$. In the expression, n represents a total number of transmission and reception modules 110 (servers 1).

Further, referring to the above-mentioned requirement for the resolution of the collision, an arbitrary decision quorum needs to contain a majority part of an arbitrary estimation quorum, and $Qe+(Qf/2) > n$. The process-saving 1-step consensus algorithm has an object to achieve $Qf > n/2$, and hence quorum sizes that satisfy the expression are as follows.

Minimum integer $Qe$ that satisfies $Qe \geq (3/4)n$

Minimum integer $Qf$ that satisfies $Qf > n/2$

The term "majority" represents a minimum integer larger than $n/2$.

Determination methods for the decision value and the estimation value are as follows.

When the values of all the pieces of data match within the decision quorum, the value is output to the decision value, and otherwise the value "empty" is output to the decision value.

When the existence of the decision quorum fails to be determined, no value is output to the decision value.

When the values of data equal to or larger than a given majority part match within the estimation quorum, the value is output to the estimation value, and otherwise the value "empty" is output to the estimation value.

A determination method for a resolution value conducted when a collision occurs is the same as that of the 1-step consensus algorithm, and is as follows.

When the estimation value is not "empty", the estimation value is output as the resolution value, and when the estimation value is "empty", an arbitrary one of the pieces of input data is set as the resolution value. For the resolution value and the estimation value, a PAXOS consensus algorithm is executed with another update module 130, to thereby be able to ensure the identity.

In the illustrated example, the processing for the quorum including the transmission and reception modules 1 is executed by the update module 1 of the server 1, but the processing may be executed by the update module n of another server 1-n.

<2-Step Consensus Module>

Figure 16:
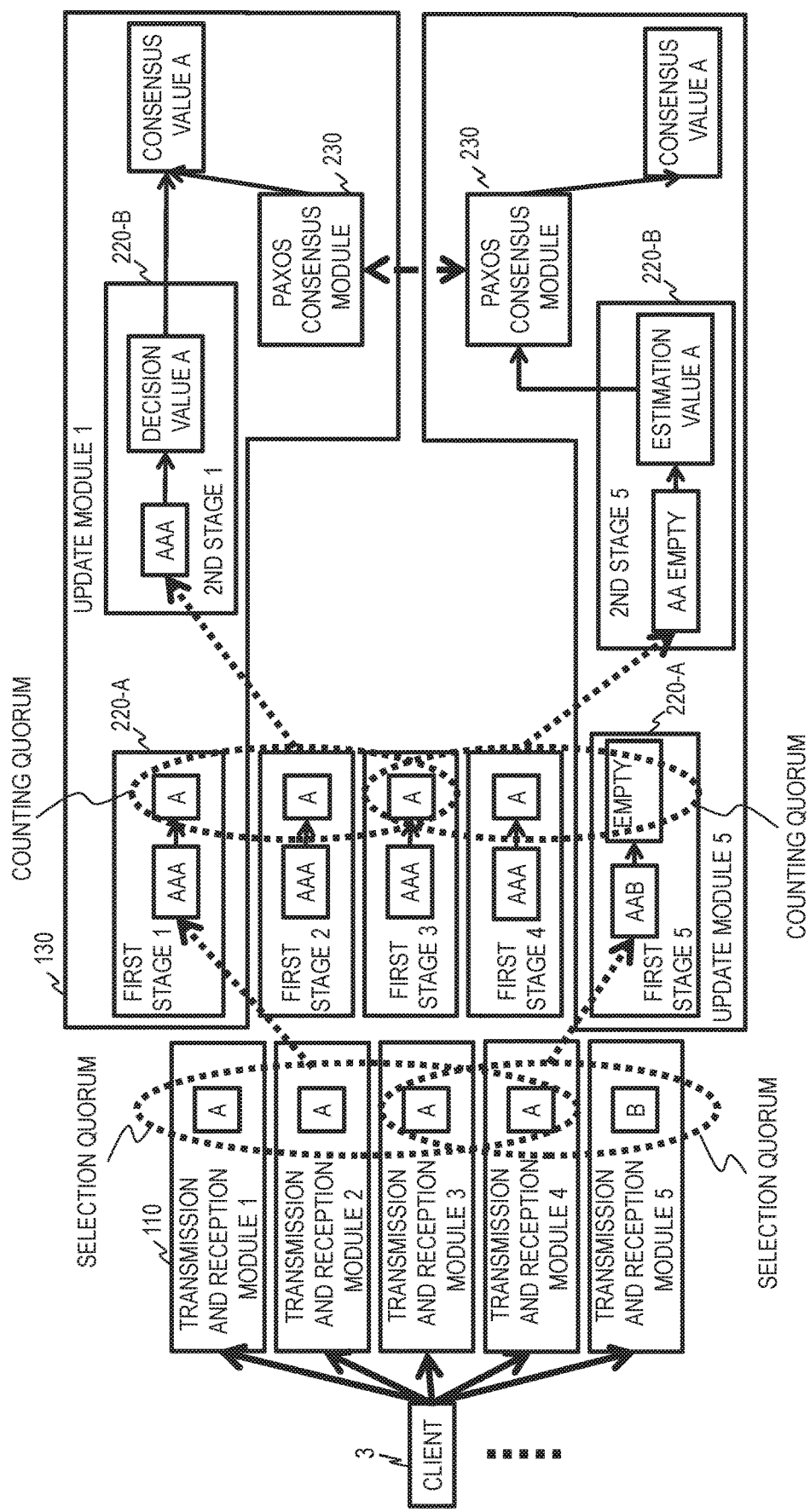
FIG. 16 is a block diagram for illustrating an example of the 2-step consensus module according to the first embodiment of this invention.

FIG. 16 is a block diagram for illustrating an example of the 2-step consensus module 220. The determination of the degree of the identity of the data and the resolution method for the collision that does not guarantee the identity, which are conducted in accordance with the 2-step consensus algorithm, are the same as those of the above-mentioned process-saving 1-step consensus algorithm (and 1-step consensus algorithm).

In FIG. 16, the respective transmission and reception modules 110 of the servers 1-1 to 1-5 of FIG. 1 are set as the transmission and reception modules 1 to 5, and the update modules 130 of the servers 1-1 and 1-5 are set as the update modules 1 and 5. Further, in FIG. 16, the 2-step consensus module 220 illustrated in FIG. 2 is divided into a first-stage module 220-A and a second-stage module 220-B. The first-stage modules 220-A of the servers 1-1 to 1-5 are indicated as first-stage modules 1 to 5, and the second-stage modules 220-B of the server 1-1 and the server 1-5 are indicated as a second-stage module 1 and a second-stage module 5. In the example illustrated in FIG. 16, the consensus value is determined by the second-stage module 1 of the server 1-1 and the second-stage module 5 of the server 1-5. Further, in the example illustrated in FIG. 16, the transmission and reception modules 1 to 4 receive the data "A" from the client 3, and the transmission and reception module 5 receives the data "B" from the client 3.

In the illustrated example, the 2-step consensus module 220 configured to execute the 2-step consensus algorithm divides the transmission and reception modules 1 to 5 into a plurality of selection quorums, and divides the first-stage modules 1 to 5 into two counting quorums, to thereby conduct processing by the update modules 1 and 5. Although not shown, inputs of the first-stage module 2 are data received by a selection quorum of the transmission and reception modules 2, 3, and 4, inputs of the first-stage module 3 are data received by the transmission and reception modules 1, 3, and 4, and inputs of the first-stage module 4 are data received by the transmission and reception modules 1, 2, and 4.

Next, the selection quorum of the transmission and reception modules 1 to 5 and the counting quorum of the first-stage modules 1 to 5 are set in the following manner.

Referring to the above-mentioned requirement for the identity of the data, arbitrary selection quorums need to always overlap each other, and data equal to or larger than the majority is required. Therefore, the size of the selection quorum is a minimum integer exceeding n/2.

Further, referring to the above-mentioned requirement for the resolution of the collision, arbitrary counting quorums need to always overlap each other, and data equal to or larger than the majority is required. Therefore, the size of the counting quorum is a minimum integer exceeding n/2.

When the data is received from the client 3-1, the transmission and reception modules 1 to 5 transmit the received data to the first-stage modules 1 to 5 of the 2-step consensus module 220 for each of the selection quorums.

When all the values of the received data match the selection quorum, the first-stage modules 1 to 5 determine the value as a selection value. Otherwise, the selection value is set to "empty".

Next, a determination method for a decision value and an estimation value conducted by the second-stage modules 1 and 5 is as follows.

When the values of all the pieces of data match within the counting quorum, the value is output to the decision value.

When the data that is not "empty" exists within the counting quorum, the value is output as the estimation value, and otherwise, "empty" is output as the estimation value.

The determination method for the resolution value is the same as that of the 1-step consensus. When the estimation value is not "empty", the estimation value is output as the resolution value, and when the estimation value is "empty", an arbitrary one of the pieces of input data is set as the resolution value. For the resolution value and the estimation value, the PAXOS consensus algorithm is executed with another update module 130, to thereby be able to ensure the identity.

<Outline of Processing>

Figure 3:
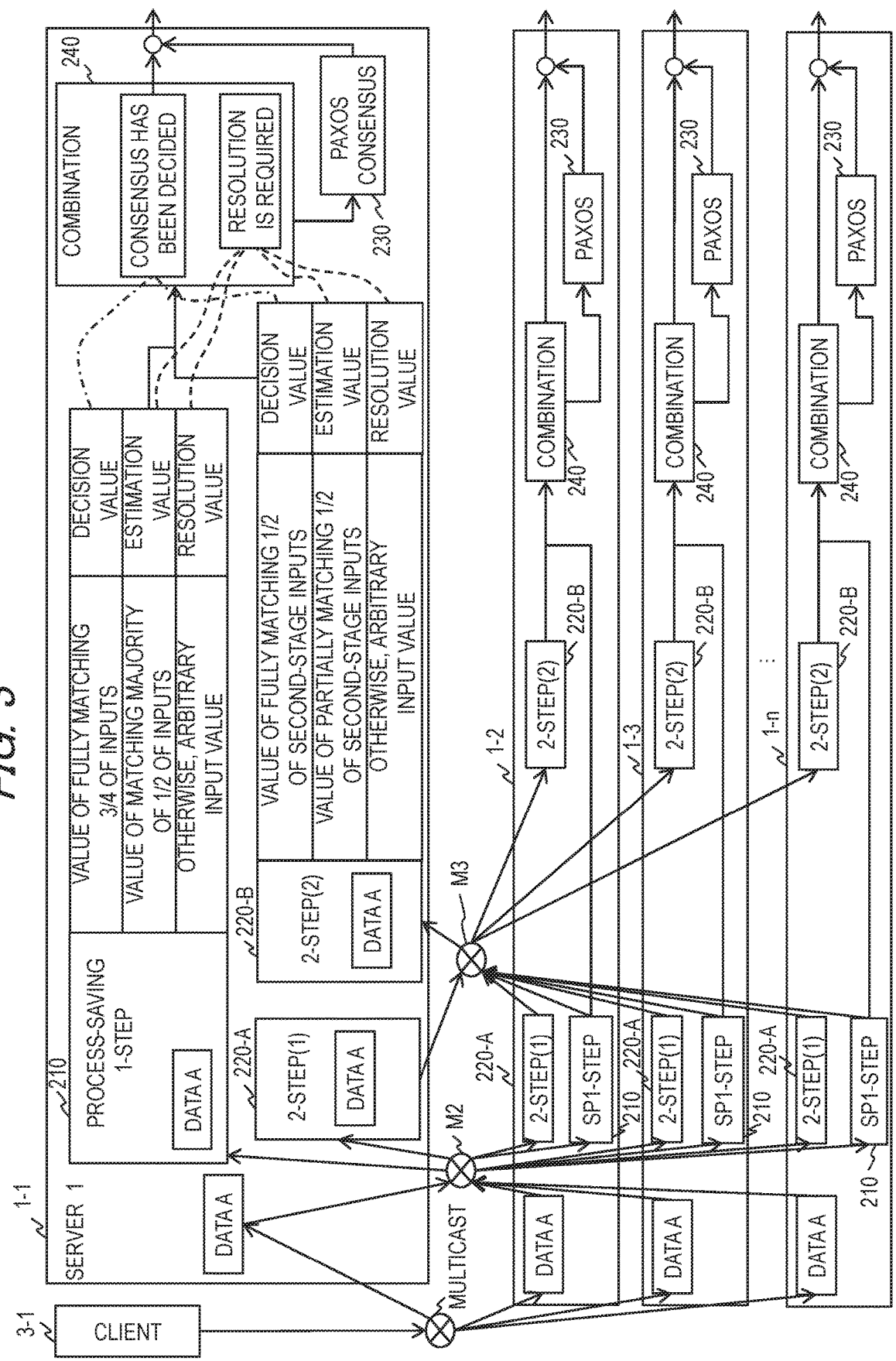
FIG. 3 is a sequence diagram for illustrating an example of the distributed data management conducted by the server according to the first embodiment of this invention.

FIG. 3 is a sequence diagram for illustrating an example of the distributed data management conducted by the server 1 according to the embodiment of this invention. In the illustrated example, the client 3-1 transmits an update request for the data A to the servers 1-1 to 1-n by multicast. The transmission by multicast from the client 3-1 to the respective servers 1 may be conducted by a management computer (not shown) or the like.

The transmission and reception module 110 of each server 1 transmits the data received from the client 3-1 to the other servers 1 by multicast (M2 in FIG. 3). The server 1 transmits the data received from the half of all the servers 1 to the update module 130, and determines the degree of the identity.

The update module 130 inputs the data within the decision quorum (or estimation quorum) illustrated in FIG. 15 to the process-saving 1-step consensus module (SP1-STEP in FIG. 3) 210. Further, the update module 130 inputs the data within the selection quorum (or counting quorum) illustrated in FIG. 16 to the 2-step consensus module 220.

When all of ¾ of the pieces of input data match (when all the pieces of data input from the decision quorum match), the process-saving 1-step consensus module 210 sets the data as a decided value (decision value). Further, when a majority of pieces of input data among ½ of the pieces of input data match, that is, when the majority of pieces of input data among the pieces of data input from the estimation quorum match, the process-saving 1-step consensus module 210 sets the data as the estimation value. Otherwise, the process-saving 1-step consensus module 210 outputs an arbitrary input value of the data received from the client 3 or other such data as the resolution value.

Subsequently, the 2-step consensus module 220 arithmetically operates the decision value, the estimation value, or the resolution value from the data within the selection quorum of the first-stage modules 220-A (2-STEP(1) in FIG. 3), and transmits the decision value, the estimation value, or the resolution value to the second-stage modules 220-B (2-STEP(2) in FIG. 3) for each of the counting quorums (M3).

When all the pieces of data input from the counting quorum match, the second-stage module 220-B outputs the data as the decision value. Further, when the pieces of data input from the counting quorum partially match, the second-stage module 220-B outputs the data as the estimation value. Otherwise, the second-stage module 220-B outputs an arbitrary input value of the data received from the client 3 or other such data as the resolution value.

Subsequently, the update module 130 inputs the outputs of the process-saving 1-step consensus module 210 and the 2-step consensus module 220 to the combination module 240. The combination module 240 selects the output of the process-saving 1-step consensus module 210 or the 2-step consensus module 220 based on a priority set in advance as shown in FIG. 4. FIG. 4 is a table for showing priorities for selecting the consensus algorithms. In FIG. 4, one entry includes a priority 2401 and characteristics 2402 for describing details to be selected. The priority is held in a condition setting module 120.

First, as a first priority, the combination module 240 selects any one of the decision value of the process-saving 1-step consensus module 210 and the decision value of the 2-step consensus module 220 as the consensus value (consensus decision value).

The decision value of the process-saving 1-step consensus module 210 is a value of matching data received from ¾ (decision quorum) of the servers 1. Further, the decision value of the 2-step consensus module 220 is a value of matching data received from ½ (counting quorum) of the servers 1 by the second-stage module 220-B.

As a second priority, the combination module 240 selects the estimation value of the 2-step consensus module 220. The estimation value is a value of partially matching data received from ½ of the servers 1 by the second-stage module 220-B of the 2-step consensus module 220 (value of partially matching data among the pieces of data received from the counting quorum).

Further, as a third priority, the combination module 240 selects the estimation value of the process-saving 1-step consensus module 210. The estimation value is a value of a matching majority of pieces of data among the pieces of data received from ½ of the servers 1 by the process-saving 1-step consensus module 210 (value of a matching majority of pieces of data among the pieces of data received from the estimation quorum).

As a fourth priority, the combination module 240 selects the resolution value of any one of the process-saving 1-step consensus module 210 and the 2-step consensus module 220.

The combination module 240 selects the output of the process-saving 1-step consensus module 210 or the 2-step consensus module 220 based on the priorities shown in FIG. 4, and then outputs the selected data as it is when the selected data is the decision value.

Meanwhile, when the estimation value or the resolution value is selected, the combination module 240 needs to execute the consensus algorithm with the other servers 1. Therefore, the combination module 240 inputs the estimation value or the resolution value that has been selected to the PAXOS consensus module 230, and determines the consensus value of the data with the other servers 1.

Then, the update module 130 stores the consensus value output from the combination module 240 or the consensus value output from the PAXOS consensus module 230 to the data storage module 140 as the data guaranteed to have the identity with the respective servers 1. Further, the update module 130 transmits a response indicating that the data has been stored to the client 3-1.

In this manner, according to the embodiment of this invention, the consensus value is obtained by combining two consensus algorithms of the process-saving 1-step consensus module 210 and the 2-step consensus module 220 and by further using the PAXOS consensus module 230 when the decision value fails to be obtained by those two consensus algorithms. With this configuration, it is possible to suppress an increase in the number of processes (or number of computers) and reduce a minimum number of times of communications conducted after the client 3 requests the server 1 to update (or refer to) the data before the consensus is reached on the server 1.

FIG. 5 is a table for comparison of performance of the respective consensus algorithms. In FIG. 5, one entry includes a name 3001 of a consensus algorithm, a number n of processes 3002 indicating the number of computers that store data necessary to guarantee consistency of data, a number e of allowable failures 3003 that can maintain the minimum number of times of communications conducted before a consensus is obtained between the client 3 and the server 1, and a minimum number δ of times of communications 3004 conducted before the consensus is obtained between the client 3 and the server 1.

First, the number of necessary processes 3002 is obtained by setting the number of pieces of data to be replicated for guaranteeing the consistency of the data as f and the number of computers that store the data as the number n of processes, and the 1-step consensus algorithm disclosed in the related art exhibits the largest number n=3f+1.

Next, in regard to the number e of allowable failures 3003 that can maintain the minimum number δ of times of communications, PAXOS and 2-step indicate the largest number e<n/2, and exhibits the highest availability. In contrast, process-saving 1-step indicates the smallest number e≤n/4, and exhibits the lowest availability. Further, the number e of allowable failures 3003 of 1-step is larger than that of process-saving 1-step, but smaller than the numbers e of allowable failures of PAXOS and 2-step.

Next, the minimum number δ of times of communications is the number of times of communications conducted after the request is received from the client 3 before a consensus is reached between the servers 1, and process-saving 1-step and 1-step exhibit the minimum number δ=2. This means that, as illustrated in FIG. 3, the update request for data is received from the client 3-1 at the first time of communications, and the transmission and reception modules 110 of the respective servers 1 transmit the received data to the other servers 1 at the second time of communications (M2). When the decision value is obtained by the process-saving 1-step consensus module 210 (or 1-step), the consensus value between the servers 1 can be obtained at two times of communications in total.

Meanwhile, in 2-step, after the above-mentioned communications (M2) between the servers 1, a result from the first-stage module 220-A is transmitted to the respective second-stage modules 220-B, which necessitates at least three times of communications. In the same manner, PAXOS requires at least three times of communications.

According to the embodiment of this invention, the process-saving 1-step consensus module 210 and the 2-step consensus module 220 are combined. Therefore, the number n of necessary processes 3002 is n=2f+1, which is smaller than that of 1-step and equivalent to that of PAXOS. The number e of allowable failures is e<n/2, which is equivalent to that of PAXOS, and has an availability higher than that of 1-step. The minimum number δ of times of communications is two, which is smaller than that of PAXOS and is equivalent to that of 1-step.

With this configuration, according to the embodiment of this invention, it is possible to maintain the number e of allowable failures which is equivalent to that of PAXOS while reducing computer resources (number n of processes) to a level lower than that of 1-step, and is further possible to ensure the minimum number δ of times of communications which is equivalent to that of 1-step. Therefore, it is possible to reduce a latency (minimum number δ of times of communications) while ensuring the availability of the distributed data management system, and is possible to suppress an increase in the computer resources.

<Details of Processing>

Figure 6:
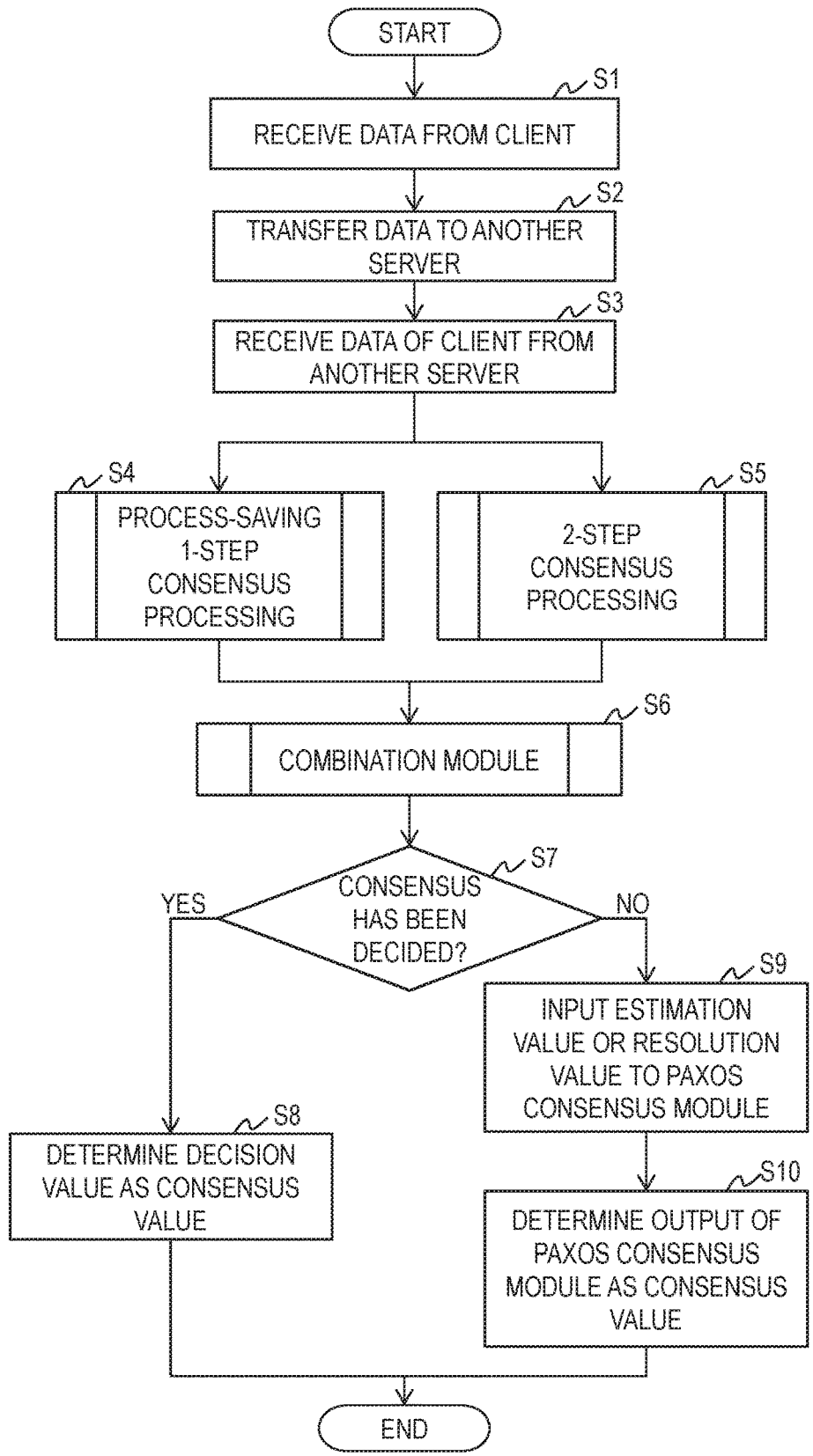
FIG. 6 is a flowchart for illustrating an example of processing conducted by each server according to the first embodiment of this invention.

FIG. 6 is a flowchart for illustrating an example of processing conducted by each server. The processing is executed when an update request for data (or reference request or registration request) is received from the client 3.

First, the server 1 receives the data included in the update request transmitted by multicast from the client 3 (S1). Subsequently, the server 1 transmits the received data to the other servers 1 by multicast (S2). The server 1 receives the data transmitted by the client 3 from half of all the servers 1 (S3).

Figure 7:
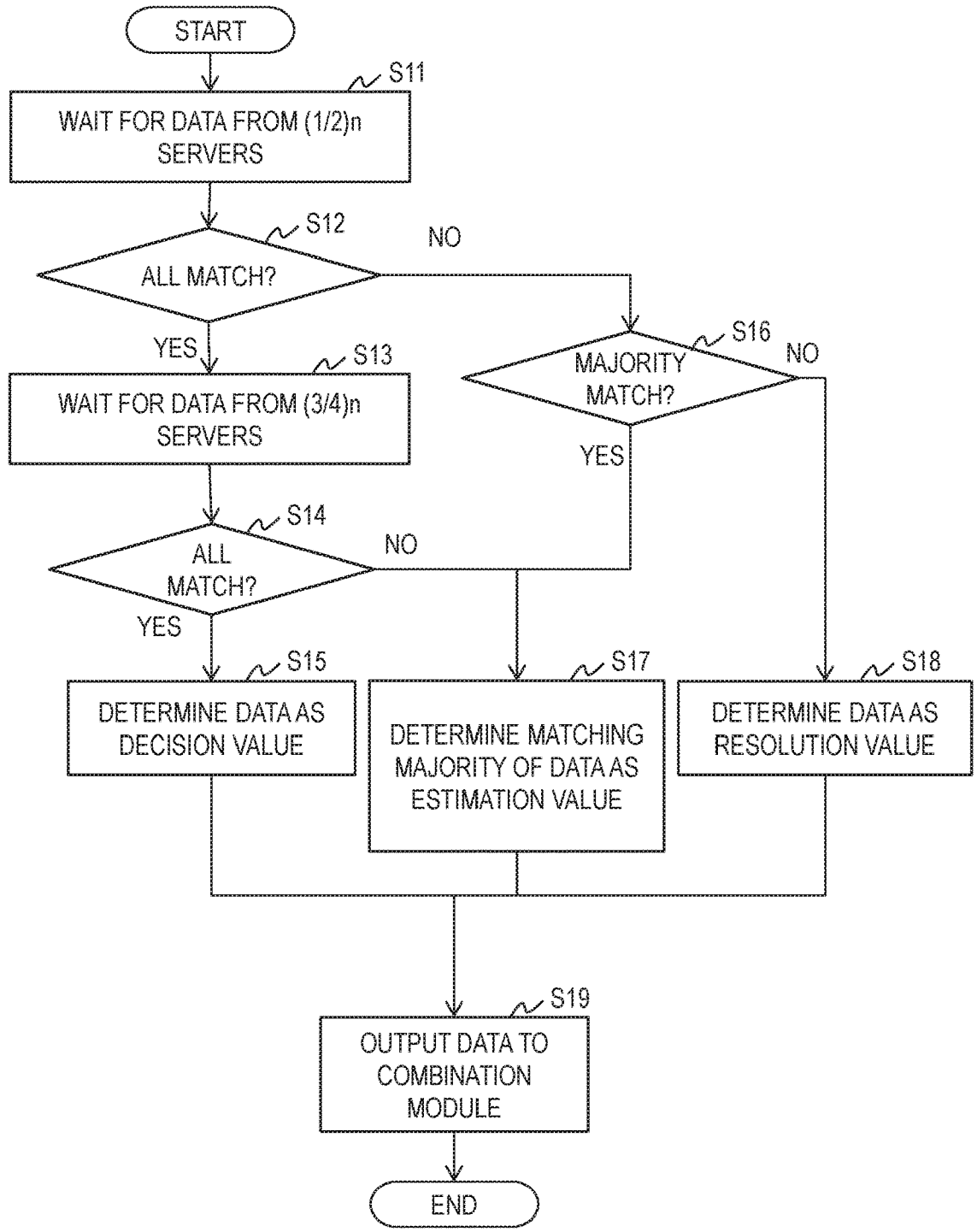
FIG. 7 is a flowchart for illustrating an example of the process-saving 1-step consensus processing conducted in Step S4 of FIG. 6 according to the first embodiment of this invention.
Figure 8:
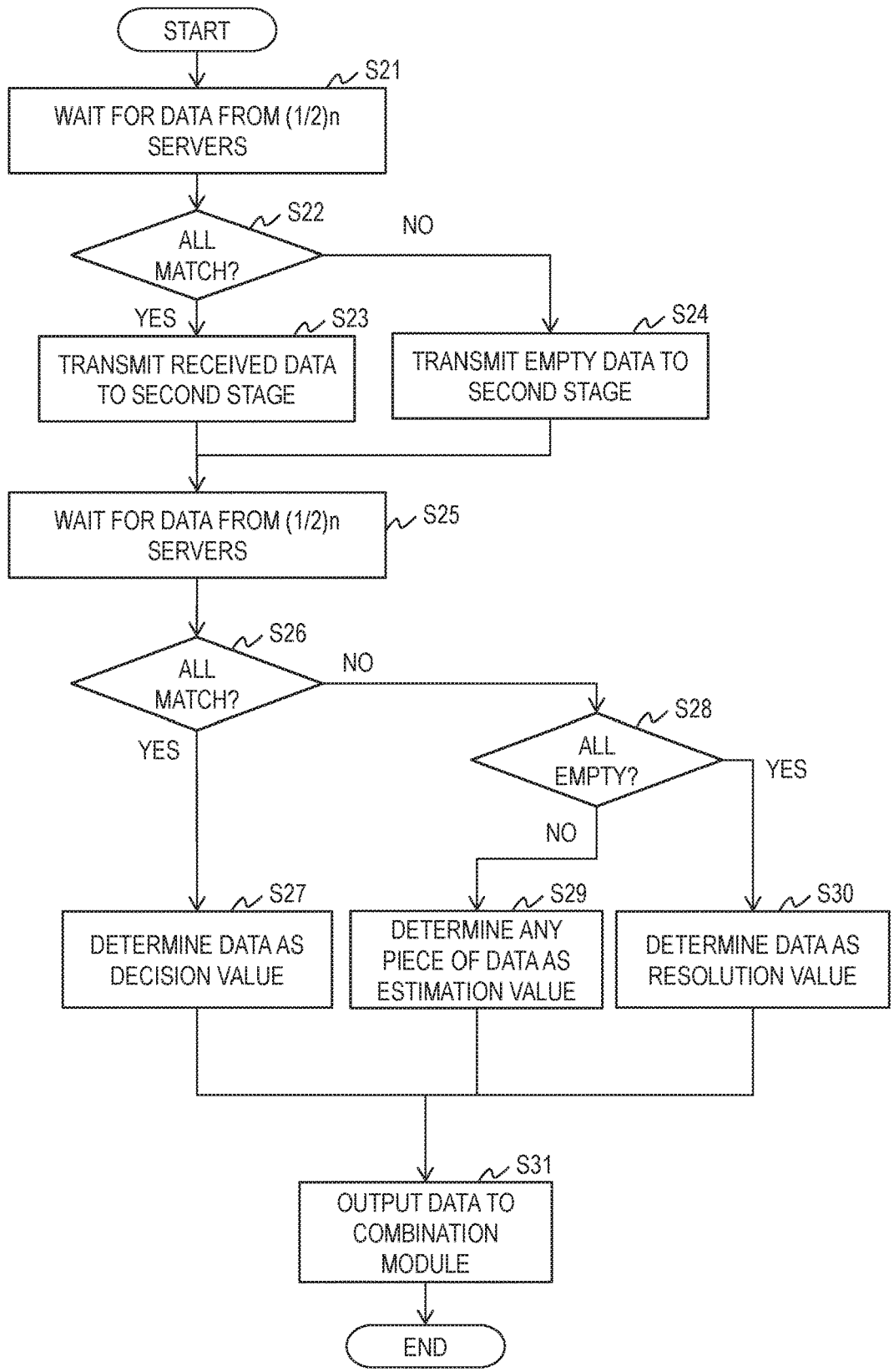
FIG. 8 is a flowchart for illustrating an example of the 2-step consensus processing conducted in Step S5 of FIG. 6. according to the first embodiment of this invention.

Subsequently, the server 1 inputs the data received from the half of all the servers 1 in Step S3 to each of process-saving 1-step consensus processing of Step S4 and 2-step consensus processing of Step S5. In Step S4, the above-mentioned processing of the process-saving 1-step consensus module 210 is executed as illustrated in FIG. 7. In Step S5, the above-mentioned processing of the 2-step consensus module 220 is executed as illustrated in FIG. 8. In the illustrated example, the process-saving 1-step consensus processing (S4) and the 2-step consensus processing (S5) are executed in parallel, but may be executed sequentially.

Figure 9:
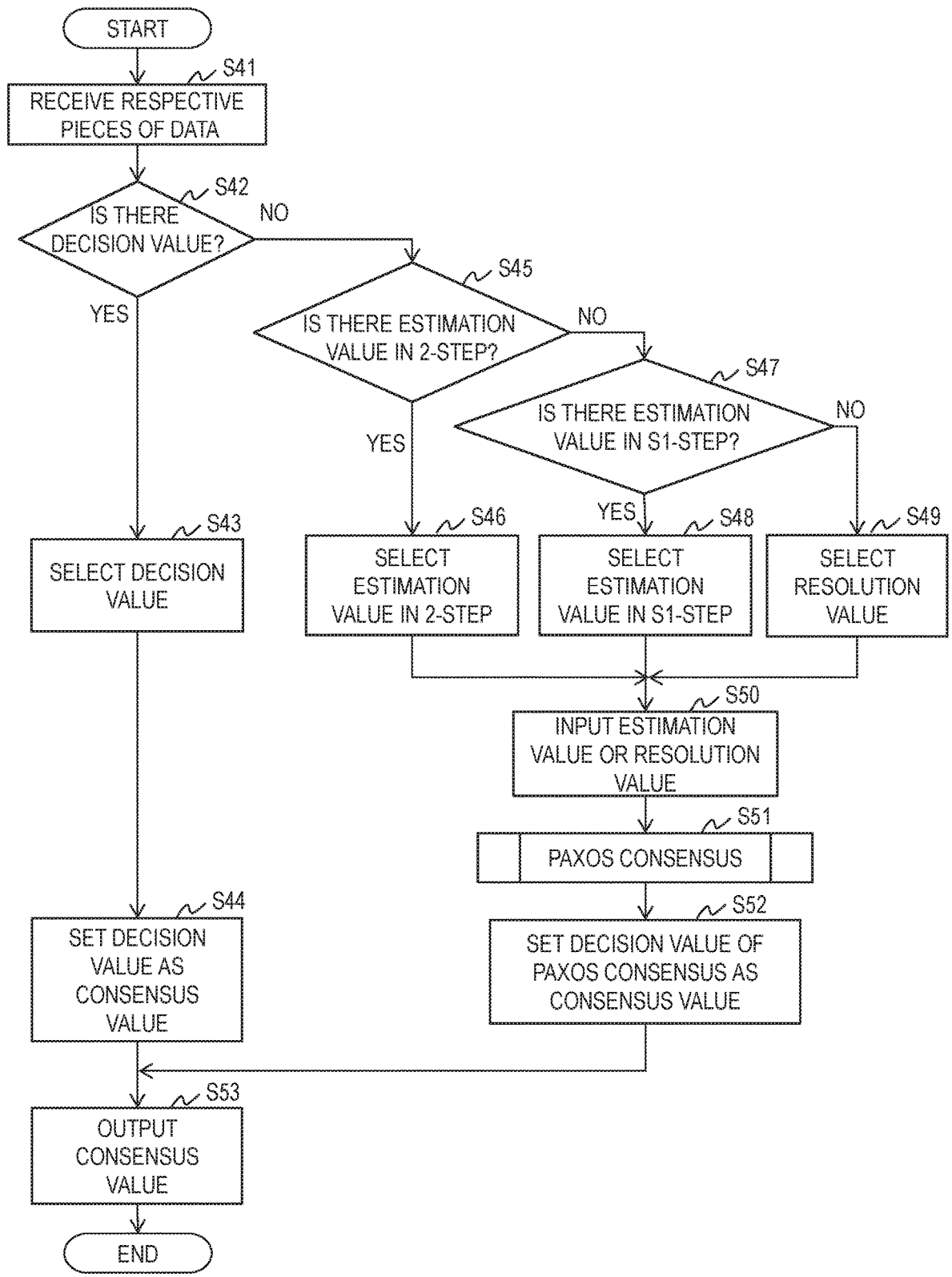
FIG. 9 is a flowchart for illustrating an example of the processing of the combination module 240 conducted in Step S6 of FIG. 6 according to the first embodiment of this invention.

In Step S6, the above-mentioned processing of the combination module 240 is executed as illustrated in FIG. 9. In Step S7, the update module 130 of the server 1 determines whether or not a decision value has been output from any one of the process-saving 1-step consensus processing and the 2-step consensus processing and the consensus has been decided. When the consensus has been decided, the procedure advances to Step S8 to determine the decision value output by the combination module 240 as the consensus value.

Meanwhile, when it is determined in Step S7 that the consensus has not been decided, the update module 130 advances to Step S9 to input the estimation value or the resolution value output by the combination module 240 to the PAXOS consensus module 230 and to execute consensus processing between the servers 1. In Step S10, the update module 130 receives an output from the PAXOS consensus module 230, and determines the output as the consensus value.

After that, the update module 130 stores the consensus value determined in Step S8 or Step S10 in the data storage module 140, and transmits the response indicating that the update has been completed to the client 3.

FIG. 7 is a flowchart for illustrating an example of the process-saving 1-step consensus processing conducted in Step S4 of FIG. 6. The processing is executed by the process-saving 1-step consensus module 210 of the update module 130.

The update module 130 waits until data is received from ½ (estimation quorum) of all the servers 1 (S11). When receiving the data from ½ of all the servers 1, which defines the estimation quorum, the update module 130 determines whether or not all the pieces of data match (S12). When all the pieces of data match, the procedure advances to Step S13, and otherwise, the procedure advances to Step S16.

In Step S13, the update module 130 waits until data is received from ¾ (decision quorum) of all the servers 1. When receiving the data from ¾ of all the servers 1, which defines the decision quorum, the update module 130 determines whether or not all those pieces of data match (S14). When all the pieces of data match, the procedure advances to Step S15, and otherwise, the procedure advances to Step S17.

In Step S15, all the pieces of data within the estimation quorum and all the pieces of data within the decision quorum match, and hence the update module 130 determines the received data as the decision value.

Meanwhile, in Step S16 conducted when it is determined in Step S12 that all the pieces of data do not match, the update module 130 determines whether or not a majority of the data match the data received by the server 1. When the majority of the data match, the procedure advances to Step S17, and otherwise, the procedure advances to Step S18.

In Step S17, the update module 130 determines the data of the matching majority as the estimation value. Meanwhile, when the majority of the data do not match within the estimation quorum, in Step S18, the update module 130 determines the data as the resolution value set in advance. The data received by the server 1 or the like can be used as the resolution value.

Subsequently, in Step S19, the update module 130 outputs the data determined in any one of Steps S15, S17, and S18 described above to the combination module 240.

With the above-mentioned processing, the update module 130 can obtain the decision value or the estimation value based on the data received from the estimation quorum and the decision quorum by the process-saving 1-step consensus algorithm.

FIG. 8 is a flowchart for illustrating an example of the 2-step consensus processing conducted in Step S5 of FIG. 6. The processing is executed by the 2-step consensus module 220 of the update module 130.

The update module 130 waits until the first-stage module 220-A receives the data from ½ (selection quorum) of all the servers 1 (S21). When receiving the data from ½ of all the servers 1, which defines the selection quorum, the update module 130 determines whether or not all those pieces of data match the data received by the server 1 (S22). When all the pieces of data match, the procedure advances to Step S23, and otherwise, the procedure advances to Step S24.

In Step S23, the first-stage module 220-A transmits the data received from the other servers 1 to the second-stage modules 220-B of the respective servers 1. Meanwhile, in Step S24 conducted when all the pieces of data within the selection quorum do not match, the first-stage module 220-A transmits the data "empty" to the second-stage modules 220-B of the respective servers 1.

Subsequently, in Step S25, the update module 130 waits until the second-stage module 220-B receives the data from ½ (counting quorum) of all the servers 1 (S25). When receiving the data from ½ of all the servers 1 that defines the counting quorum, the update module 130 determines whether or not all those pieces of data match the data received by the server 1 (S26). When all the pieces of data match, the procedure advances to Step S27, and otherwise, the procedure advances to Step S28.

In Step S28, the second-stage module 220-B determines whether or not all the pieces of data received by the second-stage module 220-B are the data "empty". When all the pieces of data received by the second-stage module 220-B are not the data "empty", the update module 130 advances to Step S29 to determine any one of the pieces of data as the estimation value.

Meanwhile, when all the pieces of data received by the second-stage module 220-B are "empty", the second-stage module 220-B advances to Step S30 to determine that the data is the resolution value set in advance. The data received by the server 1 or the like can be used as the resolution value.

Subsequently, in Step S31, the update module 130 outputs the data determined in any one of Steps S27, S29, and S30 described above to the combination module 240.

With the above-mentioned processing, the update module 130 can obtain the decision value or the estimation value based on the data received from the selection quorum and the counting quorum by the 2-step consensus algorithm.

FIG. 9 is a flowchart for illustrating an example of the processing of the combination module 240 conducted in Step S6 of FIG. 6.

First, the combination module 240 receives the outputs of the process-saving 1-step consensus processing (S4) and the 2-step consensus processing (S5) (S41). The combination module 240 determines whether or not there is a decision value in any one of the output of the process-saving 1-step consensus processing and the output of the 2-step consensus processing (S5) (S42). When there is a decision value in any one of the outputs, the procedure advances to Step S43, and otherwise, the procedure advances to Step S45.

In Step S43, the combination module 240 selects the decision value from any one of the outputs of the process-saving 1-step consensus processing and the 2-step consensus processing. Subsequently, in Step S44, the combination module 240 sets the selected decision value as the consensus value.

In Step S45, the combination module 240 determines whether or not there exists an estimation value in the output of the 2-step consensus processing. When there exists an estimation value, the procedure advances to Step S46, and otherwise, the procedure advances to Step S47.

In Step S46, the combination module 240 selects the estimation value of the 2-step consensus processing, and advances to Step S50.

In Step S47, the combination module 240 determines whether or not there exists an estimation value in the output of the process-saving 1-step consensus (S1-STEP in FIG. 9) processing. When there exists an estimation value, the procedure advances to Step S48, and otherwise, the procedure advances to Step S49.

In Step S48, the combination module 240 selects the estimation value of the process-saving 1-step consensus processing, and advances to Step S50. Meanwhile, in Step S49, the combination module 240 selects the resolution value, and advances to Step S50. In this case, the value set in advance by the combination module 240, the value received by the transmission and reception module 110, or the like may be used as the resolution value.

Subsequently, in Step S50, the combination module 240 inputs the value selected in any one of Steps S46, S48, and S49 to the PAXOS consensus module 230. In Step S51, the PAXOS consensus module 230 arithmetically operates the consensus value with the other servers 1, and outputs the consensus value. The PAXOS consensus module 230 is, for example, the same as that of U.S. Pat. No. 5,261,085 B2 according to the above-mentioned related art, and is not described below in detail. In Step S52, the combination module 240 sets the decision value of the PAXOS consensus module 230 as the consensus value.

In Step S53, the combination module 240 outputs the consensus value obtained in any one of Steps S44 and S52.

With the above-mentioned processing, in the combination module 240 of the update module 130, the decision value of any one of the process-saving 1-step consensus module 210 and the 2-step consensus module 220 can be set as the consensus value. Further, when the decision value fails to be obtained in both the process-saving 1-step consensus module 210 and the 2-step consensus module 220, the consensus value can be obtained from the PAXOS consensus module 230 with the input of the estimation value or the resolution value.

As described above, according to the first embodiment, the process-saving 1-step consensus module 210 and the 2-step consensus module 220 are combined, and the PAXOS consensus module 230 is further employed as the auxiliary consensus module, to thereby be able to set the number n of necessary processes to the value that is smaller than that of the 1-step consensus algorithm and equivalent to that of PAXOS in the above-mentioned manner. Further, the number e of allowable failures according to the embodiment of this invention is maintained to be e<n/2, which is equivalent to that of PAXOS, and the minimum number δ of times of communications is two, which is smaller than that of PAXOS and equivalent to that of the 1-step consensus algorithm. Therefore, it is possible to maintain the number e of allowable failures which is equivalent to that of PAXOS while reducing the computer resources (number n of processes) to a level lower than that of the 1-step consensus algorithm, and is further possible to ensure the minimum number δ of times of communications which is equivalent to that of the 1-step consensus algorithm. Therefore, it is possible to reduce a latency (minimum number of times of communications) while ensuring the availability of the distributed data management system, and is possible to suppress an increase in the computer resources. Further, unlike PAXOS, the embodiment of this invention does not require a master computer, and is not therefore influenced by a failure or a delay in the master computer.

When the decision value is output from neither the process-saving 1-step consensus module 210 nor the 2-step consensus module 220, the PAXOS consensus module 230 arithmetically operates the consensus value, but the latency increases when the PAXOS consensus module 230 is frequently executed.

In this case, the PAXOS consensus module 230 is executed over a predetermined number of times within a unit time (for example, 10 seconds to 1 minute), and the update module 130 may calculate the consensus value by only the PAXOS consensus module 230 without executing the process-saving 1-step consensus module 210 or the 2-step consensus module 220. In this situation, the update module 130 may stop executing the process-saving 1-step consensus module 210 and the 2-step consensus module 220, or may stop inputting data to the process-saving 1-step consensus module 210 and the 2-step consensus module 220.

Second Embodiment

Figure 10:
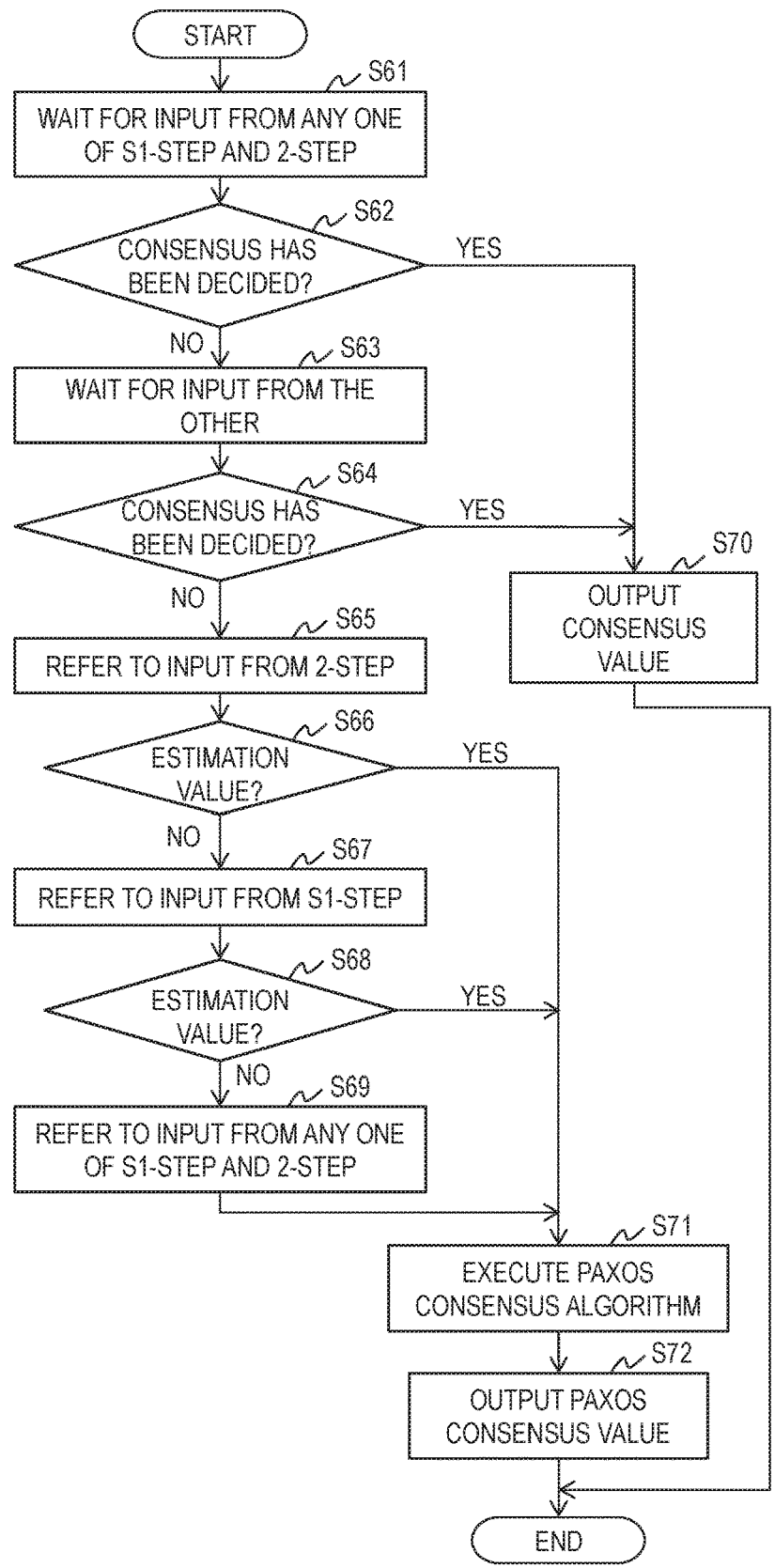
FIG. 10 is a flowchart for illustrating an example of processing conducted by the combination module according to a second embodiment of this invention.

FIG. 10 is a flowchart for illustrating an example of processing conducted by the combination module 240 when the pieces of data received from the client 3 are processed in a total order according to a second embodiment of this invention. The second embodiment is provided by changing the processing of the combination module 240 according to the first embodiment, and the other configurations are the same as those of the first embodiment.

The total order indicates that the respective transmission and reception modules 110 compare the received data every time. In the second embodiment, when data having a higher priority is successfully obtained, data having a lower priority is discarded, and only the data having a higher priority is used to guarantee the consistency of the data. The processing of FIG. 10 is executed by the processing of the combination module of Step S6 illustrated in FIG. 6 of the first embodiment.

In Step S61, the combination module 240 waits until an output result is input from any one of the process-saving 1-step consensus processing (S1-STEP in FIG. 10) and the 2-step consensus processing (2-STEP in FIG. 10).

When the output result is input, the combination module 240 determines whether or not the output result is the decision value and is an output of the process-saving 1-step consensus processing having a high priority (S62). When the output result is the decision value of the process-saving 1-step consensus processing having a high priority, the combination module 240 determines that the consensus has been decided, and advances to Step S70. Meanwhile, when the output result is the decision value of a 2-step consensus having a low priority or a value other than the decision value, e.g., the estimation value, the combination module 240 advances to Step S63 to wait until the output result is input from the other (S63).

When receiving the output result from the other, the combination module 240 determines whether or not the output result is the decision value (S64). When the received output result is the decision value, the decision value has been input from each of the 2-step consensus processing and the process-saving 1-step consensus processing (first priority), and hence the combination module 240 determines that the consensus has been decided, and advances to Step S70. In Step S70, the combination module 240 outputs, as the consensus value, the decision value having the consensus decided in Step S62 or S64. Meanwhile, the combination module 240 advances to Step S65 when the output result that has been input is not the decision value.

In Step S65, the combination module 240 refers to the output result of the 2-step consensus processing to determine whether or not the output result is the estimation value in Step S66. When the output result is the estimation value of the 2-step consensus processing having the second priority, the combination module 240 advances to Step S71 to input the estimation value to the PAXOS consensus module 230. Meanwhile, when the output result is not the estimation value of the 2-step consensus processing, the combination module 240 advances to Step S67.

In Step S67, the combination module 240 refers to the output result of the process-saving 1-step consensus processing to determine whether or not the output result is the estimation value in Step S68. When the output result is the estimation value of the process-saving 1-step consensus processing having the third priority, the combination module 240 advances to Step S71 to input the estimation value to the PAXOS consensus module 230. Meanwhile, when the output result is not the estimation value of the process-saving 1-step consensus processing, the combination module 240 advances to Step S69.

In Step S69, the combination module 240 refers to the input of the process-saving 1-step consensus processing or the input of the 2-step consensus processing (input from the client 3 or input from the first-stage module 220-A of another server 1) to select any one of the inputs. In Step S71, the combination module 240 inputs the estimation value referred to in Step S66 or S68 or the input selected in Step S69 to the PAXOS consensus module 230, and arithmetically operates the consensus value with the respective servers 1. In Step S72, the output from the PAXOS consensus module 230 is output as the consensus value.

In the first embodiment, the example of receiving both the outputs of the process-saving 1-step consensus processing and the 2-step consensus processing is described, but in the second embodiment, the processing is executed when any one of the outputs of the process-saving 1-step consensus processing and the 2-step consensus is received.

In this case, when a decision value is obtained in the process-saving 1-step consensus processing exhibiting a small number of times of communications to/from another server 1, the decision value is set as the consensus value, to thereby be able to complete the processing without waiting for the 2-step consensus processing to achieve a speedup of the processing.

In other words, the update module 130 sets a priority for the decision value (determination result) in advance, and when a decision value having a higher priority is successfully acquired, discards the determination result having a lower priority. Then, the update module 130 guarantees the consistency of the data with only the decision value having the higher priority.

Third Embodiment

FIG. 11 to FIG. 14 are illustrations of an example of processing the data received from the client 3 in a partial order according to a third embodiment of this invention.

Figure 11:
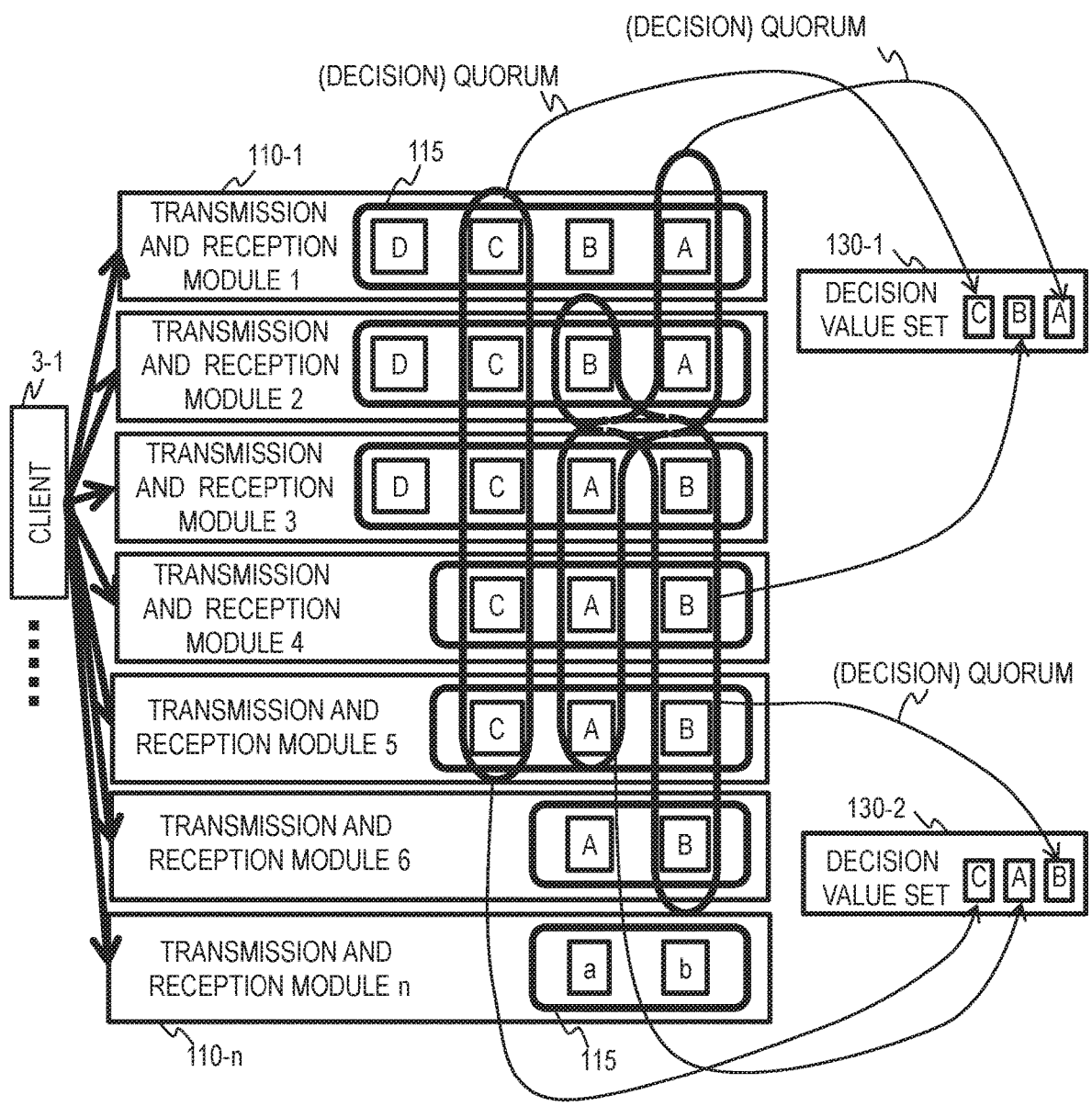
FIG. 11 is a block diagram for illustrating an example of the data received by the transmission and reception modules according to a third embodiment of this invention.

FIG. 11 is a block diagram for illustrating an example of the data received by the transmission and reception modules 110 of the respective servers 1 when the data received from the client 3 is processed in the partial order according to the third embodiment of this invention.

In FIG. 11, the transmission and reception modules 1 to n (110-1 to 110-n) are components of the servers 1-1 to 1-n. The transmission and reception modules 110 each include a buffer 115 capable of storing a plurality of pieces of data in an arrival order. The other configurations are the same as those of the first embodiment. The update modules 130-1 and 130-2 of FIG. 11 are components of the servers 1-1 and 1-2.

In this case, in partial order processing, as long as pieces of input data are commutable in terms of an order, even when the respective transmission and reception modules 110 deliver the pieces of data to the update module 130 in different orders, a final result of processing the pieces of input data by the update module 130 is the same among the update modules 130 of all the servers 1. In the third embodiment, when the pieces of data match by commuting the pieces of data in terms of the order, the transmission and reception module 110 changes the order of the pieces of data to be transmitted to the update module 130, to thereby cause the data of the update modules 130 of the respective servers 1 to match to reduce occurrences of a collision (disagreement between the pieces of data).

In the partial order processing, an order in which pieces of data having a matching number of (five in the illustrated example) elements of the quorum among all the pieces of data within the buffer 115 are transmitted to the update module 130 as the decision value is determined as long as the transmission and reception modules 110 of the servers 1 are receiving the pieces of data that are commutable in terms of the order instead of a set of pieces of data transmitted by multicast by the client 3-1. In the partial order processing, when the pieces of data that are not commutable in terms of the order are received, the collision is resolved.

Figure 12:
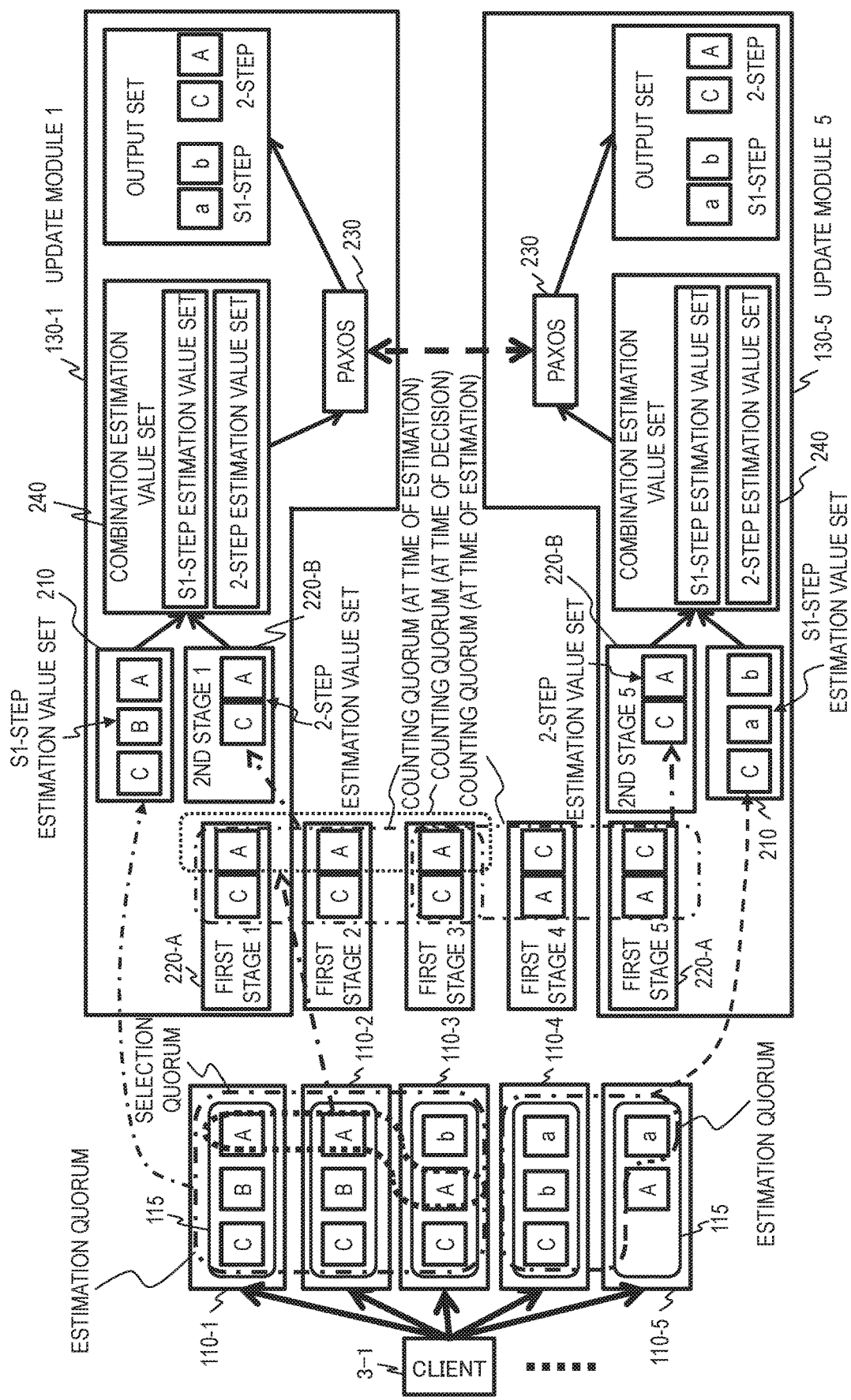
FIG. 12 is a block diagram for illustrating an example of the computer system configured to resolve the collision of the data by the partial order processing according to the third embodiment of this invention.

In the illustrations of FIG. 11 and FIG. 12, it is assumed that the pieces of data indicated by the same character in uppercase and lowercase are not commutable in terms of the order and otherwise are commutable in terms of the order. For example, the data A and the data a are not commutable in terms of the order, and the data A and the data B as well as the data A and the data b are commutable in terms of the order.

FIG. 12 is a block diagram for illustrating an example of the computer system configured to resolve the collision of the data by the partial order processing. FIG. 12 is an illustration of an example of resolving the collision of the data by applying the partial order processing to the process-saving 1-step consensus module 210 and the 2-step consensus module 220 (first-stage module 220-A and second-stage module 220-B) and the combination module 240.

In the example of FIG. 12, the transmission and reception modules 110-1 to 110-5 and the first-stage modules 1 to 5 (220A) represent components of the servers 1 to 5, and the consensus algorithm is executed by the update modules 130-1 and 130-5 of the servers 1 and 5. The transmission and reception modules 110-1 to 110-5 each include the buffer 115 configured to hold a plurality of pieces of data in an input order as described above.

The buffers 115 of the transmission and reception modules 110-1 and 110-2 hold the pieces of data "C", "B", and "A". The buffer 115 of the transmission and reception module 110-3 holds the pieces of data "C", "A", and "b". The buffer 115 of the transmission and reception module 110-4 holds the pieces of data "C", "b", and "a". The buffer 115 of the transmission and reception module 110-5 holds the pieces of data "A" and "a".

In the above-mentioned case, the pieces of data within the buffers 115 of the transmission and reception modules 110-1 and 101-2 are the same, and there occur collisions among the pieces of data "A", "C", "a", and "b" within the buffers 115 of the transmission and reception modules 110-3 to 110-5.

In this example, the estimation values of the process-saving 1-step consensus module 210 of the server 1 are "C", "B", and "A", and the estimation values of the 2-step consensus module 220 are "C" and "A". In the same manner, the estimation values of the process-saving 1-step consensus module 210 of the server 5 are "C", "a", and "b", and the estimation values of the 2-step consensus module 220 are "C" and "A".

In the resolution of the collision, the estimation value of the 2-step consensus module 220 (hereinafter referred to as "2-step (2-STEP in FIG. 12) estimation value") and the estimation value of the process-saving 1-step consensus module 210 (hereinafter referred to as "1-step (S1-STEP in FIG. 12) estimation value") are each determined. Then, as described later, the 2-step estimation value and the 1-step estimation value are output to the combination module 240 in the stated order.

The combination module 240 combines the 2-step estimation value and the 1-step estimation value that have been input, inputs the combined estimation value to the PAXOS consensus module 230 being the auxiliary consensus module, and executes the consensus algorithm with the other servers 1.

The update module 130 again separates a result of the consensus being the output of the PAXOS consensus module 230 into the 2-step estimation value and the 1-step estimation value, and outputs the 2-step estimation value and the 1-step estimation value to the respective update modules 130 in the stated order.

When the 2-step estimation value and the 1-step estimation value are output in an order different from the stated order, there is a fear that the 1-step estimation value may be transmitted first. In this case, even when the data A has been transmitted to the update module 130-1, the data a that cannot be commuted with the data A is transmitted to the update module 130-5 first, and the consistency of the data is lost.

Therefore, in the embodiment of this invention, when a collision occurs as described above, the 1-step estimation value is determined after the 2-step estimation value, and the estimation value obtained by combining those values is subjected to the PAXOS consensus (auxiliary consensus) algorithm. A result of the PAXOS consensus is again separated into the 2-step estimation value and the 1-step estimation value, and the 2-step estimation value and the 1-step estimation value are output in the stated order.

With the above-mentioned processing, in the case of conducting the partial order processing by combining the process-saving 1-step consensus module 210 and the 2-step consensus module 220, when the data having the highest priority which has reached a consensus fails to be acquired, an auxiliary consensus algorithm is executed through use of all the values including a value having a lower priority. This allows the consistency of the data to be guaranteed even when a collision occurs in the data.

Figure 13:
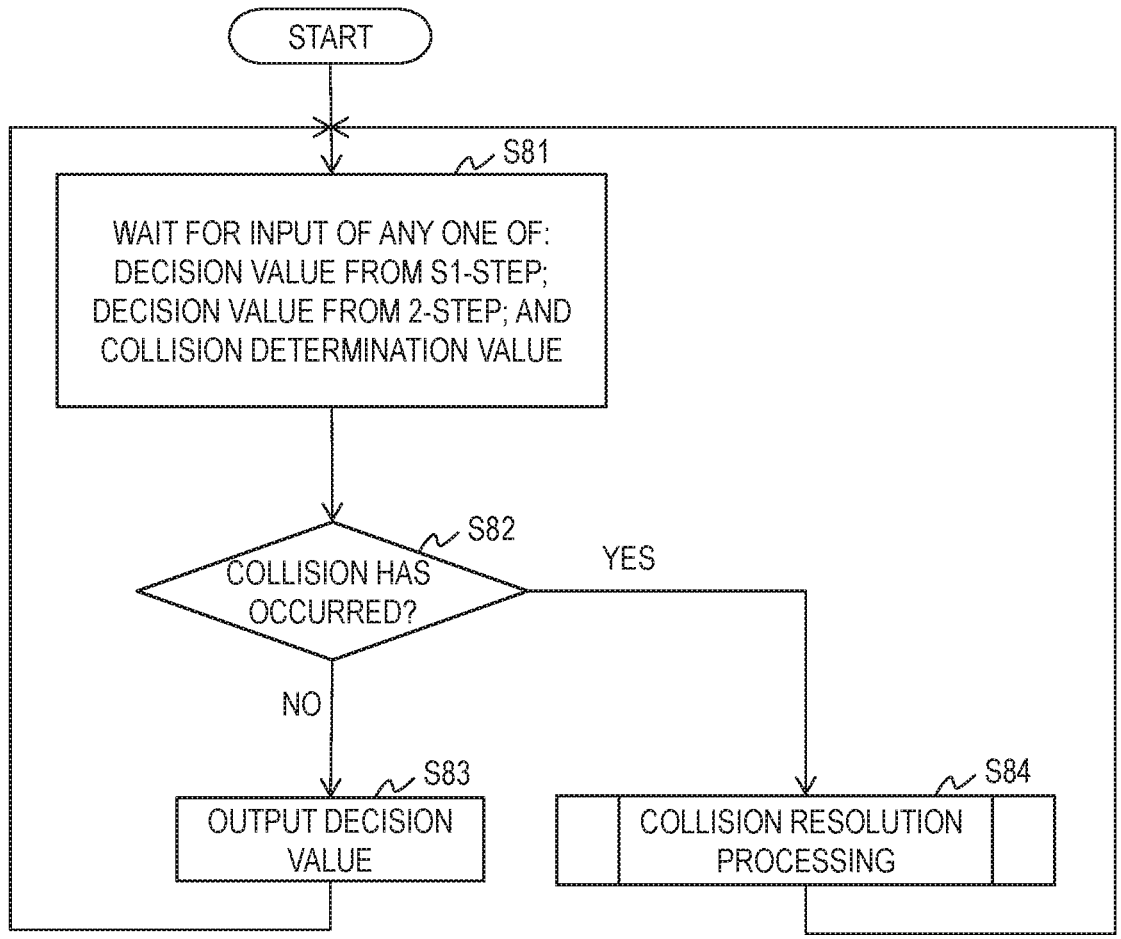
FIG. 13 is a flowchart for illustrating an example of the partial order processing conducted by the combination module according to the third embodiment of this invention.

FIG. 13 is a flowchart for illustrating an example of the partial order processing conducted by the combination module 240. Further, FIG. 14 is a flowchart for illustrating an example of the processing conducted in collision resolution processing of Step S84 of FIG. 13.

First, in Step S81, the combination module 240 waits for the input of any one of the decision value from the process-saving 1-step consensus module 210, the decision value from the 2-step consensus module 220, and a collision determination value. The collision determination value is an estimation value or a resolution value (or unfixed or arbitrary value) input from any one of the process-saving 1-step consensus module 210 and the 2-step consensus module 220. When receiving the input, the combination module 240 determines whether or not the received data is the collision determination value (S82). When the collision determination value is input, the procedure advances to Step S84, and when the decision value is input, the procedure advances to Step S83.

In Step S83, the combination module 240 outputs the received decision value as the consensus value, and returns to Step S81 to repeat the processing. In Step S84, the combination module 240 executes the collision resolution processing illustrated in FIG. 14, and after resolving the collision, returns to Step S81 to repeat the processing.

Figure 14:
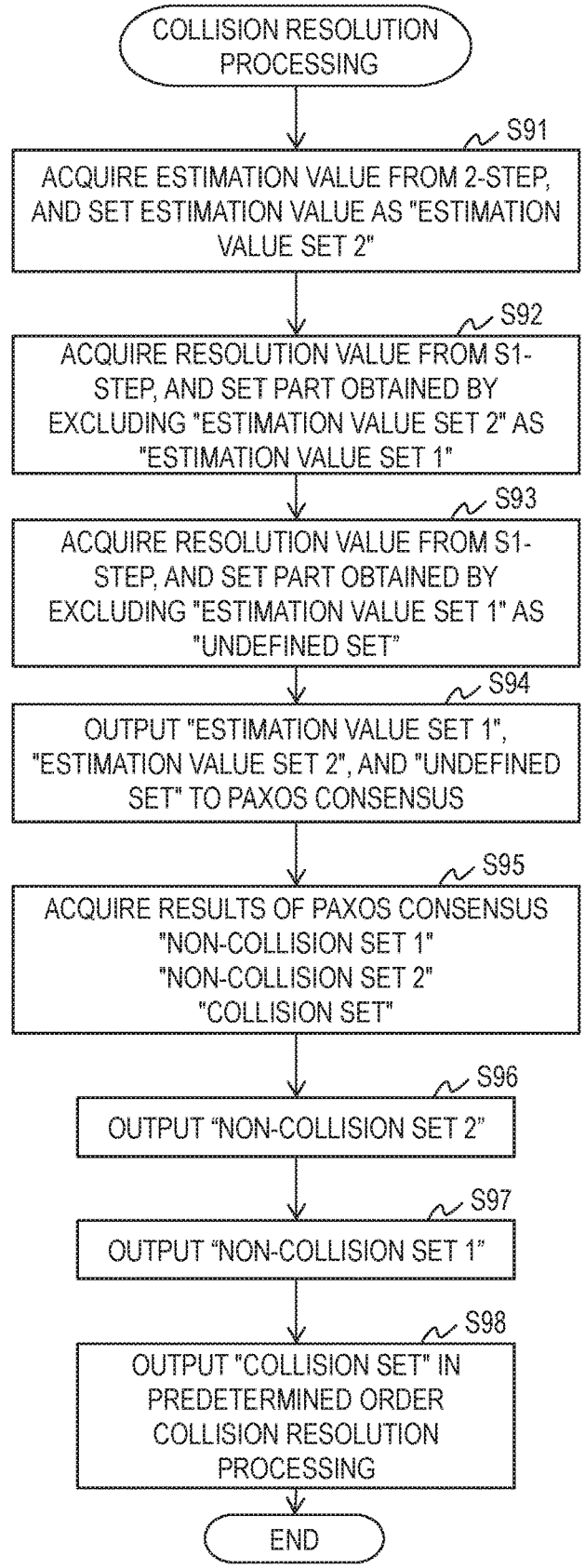
FIG. 14 is a flowchart for illustrating an example of the processing conducted in collision resolution processing of Step S84 of FIG. 13 according to the third embodiment of this invention.

Now, the collision resolution processing of FIG. 14 is described. In Step S91, the combination module 240 acquires the estimation value having a high priority from the 2-step consensus module 220. When the estimation value acquired from the 2-step consensus module 220 exists, the combination module 240 sets the estimation value as an estimation value set 2. When the estimation value acquired from the 2-step consensus module 220 does not exist, the combination module 240 sets the estimation value set 2 to an "empty" set, and advances to the subsequent step.

In Step S92, the combination module 240 acquires the estimation value having a high priority from the process-saving 1-step consensus module 210. When the estimation value acquired from the process-saving 1-step consensus module 210 exists, the combination module 240 sets, as an estimation value set 1, a part obtained by excluding the data of the estimation value set 2 set in Step S91 from the estimation values. When the estimation value acquired from the process-saving 1-step consensus module 210 does not exist, the combination module 240 sets the estimation value set 1 to the "empty" set, and advances to the subsequent step.

In Step S93, the combination module 240 acquires the resolution value having a low priority from the process-saving 1-step consensus module 210. When the resolution value acquired from the process-saving 1-step consensus module 210 exists, the combination module 240 sets, as an undefined set, a part obtained by excluding the data of the estimation value set 1 set in Step S92 and the estimation value set 2 set in Step S91 from the resolution values. When the resolution value acquired from the process-saving 1-step consensus module 210 does not exist, the combination module 240 sets the undefined set to the "empty" set, and advances to the subsequent step.

In Step S94, the combination module 240 inputs the estimation value set 1, the estimation value set 2, and the undefined set that are described above to the PAXOS consensus module 230 in the stated order, and executes the PAXOS consensus algorithm with the other servers 1.

In Step S95, the PAXOS consensus module 230 outputs a PAXOS consensus value corresponding to the estimation value set 1 as a non-collision set 1, a PAXOS consensus value corresponding to the estimation value set 2 as a non-collision set 2, and a PAXOS consensus value corresponding to the undefined set as a collision set.

In Step S96, the update module 130 first outputs the non-collision set 2 corresponding to the estimation value set 2. Subsequently, in Step S97, the update module 130 outputs the non-collision set 1 corresponding to the estimation value set 1. Finally, in Step S98, the update module 130 outputs the collision set corresponding to the undefined set in a predetermined order.

With the above-mentioned processing, the combination module 240 that forms the update module 130 can resolve the collision to guarantee the consistency of the data based on the PAXOS consensus. In FIG. 12, the illustrations of the undefined set and the collision set are omitted, but when the undefined set occurs, the processing may be conducted in the same manner as in FIG. 14.

In other words, the update module 130 sets a priority for the determination result in advance, and when the decision value (determination result) having the highest priority fails to be acquired, uses the determination result having a lower priority to guarantee the consistency of the data. It is desired that all the determination results having a lower priority be used.

<Supplement>

A computer-readable non-transitory data recording medium having stored thereon a program for controlling a server, the program controlling the server to execute:

a first step of determining a degree of consistency of received data by a first determination module configured to determine the degree of the consistency of replicated data;

a second step of determining the degree of the consistency of the received data by a second determination module having a larger number of allowable failures in the server than the first determination module and having a larger minimum number of times of communications conducted between the servers in order to determine the degree of the consistency of the data;

a third step of receiving a determination result of the degree of the consistency of the data from one of the first determination module and the second determination module, and outputting the data guaranteed to have the consistency when the determination result includes data for guaranteeing the consistency; and a fourth step of storing the data guaranteed to have the consistency.

What is claimed is:

1. A data management system, comprising a plurality of servers each comprising a processor, a memory, and a storage apparatus, the data management system being configured to receive and store data by the plurality of servers and to replicate and hold the data, the plurality of servers each comprising:

a first determination module, of one server, configured to receive replicated data sent from other servers and determine a degree of consistency between the replicated data received from the other servers and data received by the one server from a client;

a second determination module, of the one server, configured to determine a degree of consistency of the replicated data received from the other servers and data received by the one server from the client, the second determination module having a larger number of allowable failures in each of the plurality of servers than the first determination module and having a larger minimum number of times of communications conducted between the plurality of servers than the first determination module in order to determine the degree of the consistency of the data;

a combination module configured to receive a determination result of the degree of the consistency of the data from one of the first determination module and the second determination module, and to output the data guaranteed to have the consistency when the determination result includes data for guaranteeing the consistency; and a data storage module configured to store the data output by the combination module, wherein the second determination module comprises:
  a first-stage determination module configured to:
    determine the degree of the consistency of the data; and
    output a first determination result; and
  a second-stage determination module configured to:
    receive the first determination result from the first-stage determination module of another one of the plurality of servers;
    determine the degree of the consistency of the data from a plurality of the first determination results; and
    output a second determination result, wherein the combination module is configured to output, when the determination results of both the first determination module and the second determination module fail to guarantee the consistency, partially matching data among the second determination results received from a majority of the plurality of servers by the second-stage determination module of the second determination module wherein the first determination module is configured to determine the degree of the consistency of the data based on the replicated data received from the majority of all the plurality of servers, wherein the combination module is configured to output, when there is no partially matching data among the second determination results received from the majority of the plurality of servers by the second-stage determination module of the second determination module, data of a matching majority of pieces of data among pieces of data received from the plurality of servers by the first determination module, and wherein the combination module is configured to acquire, when there is no data of the matching majority of the pieces of data among the pieces of data received from the plurality of servers by the first determination module, a predetermined resolution value from one of the first determination module and the second determination module, and to output the resolution value.

2. The data management system according to claim 1, further comprising a third determination module configured to determine the degree of the consistency of the data through use of a Paxos algorithm, wherein the combination module is configured to output, when there is no partially matching data among the second determination results received from the majority of the plurality of servers by the second-stage determination module of the second determination module, data that is based on a determination result of the third determination module.

3. The data management system according to claim 2, wherein, when the third determination module is executed over a number of times set in advance within a predetermined time period, processing of the first determination module and processing of the second determination module are inhibited from being executed, and the data output by the third determination module is stored in the data storage module.

4. The data management system according to claim 1, wherein the combination module is configured to:
set a priority for each of the determination result of the first determination module and the determination result of the second determination module;
discard, when the determination result having a higher priority is successfully acquired, the determination result having a lower priority; and
guarantee the consistency of the data with the determination result having the higher priority.

5. The data management system according to claim 1, wherein the combination module is configured to:
set a priority for each of the determination result of the first determination module and the determination result of the second determination module; and
guarantee, when the determination result having a highest priority fails to be acquired, the consistency of the data through use of the determination result having a lower priority.

6. A data management method for receiving and storing data by a plurality of servers each comprising a processor, a memory, and a storage apparatus and for replicating and holding the data, the data management method comprising:
a first step of determining, by each of the plurality of servers, a degree of consistency by a first determination module configured to determine the degree of the consistency of received replicated data sent from other servers and data received from a client;
a second step of determining, by each of the plurality of servers, the degree of the consistency of the replicated data received from the other servers and data received by the one server from the client by a second determination module, the second determination module having a larger number of allowable failures in each of the plurality of servers than the first determination module and having a larger minimum number of times of communications conducted between the plurality of servers than the first determination module in order to determine the degree of the consistency of the data;
a third step of receiving, by each of the plurality of servers, a determination result of the degree of the consistency of the data from one of the first determination module and the second determination module, and outputting the data guaranteed to have the consistency when the determination result includes data for guaranteeing the consistency; and
a fourth step of storing, by each of the plurality of servers, the data guaranteed to have the consistency,
wherein the second determination module comprises:
a first-stage determination module configured to:
determine the degree of the consistency of the data; and output a first determination result; and
a second-stage determination module configured to:
receive the first determination result from the first-stage determination module of another one of the plurality of servers;
determine the degree of the consistency of the data from a plurality of the first determination results; and
output a second determination result,
wherein the third step comprises outputting, when the determination results of both the first determination module and the second determination module fail to guarantee the consistency, partially matching data among the second determination results received from a majority of the plurality of servers by the second-stage determination module of the second determination module,
wherein the method further comprises a fifth step of determining, by each of the plurality of servers, the degree of the consistency of the data based on the replicated data received from the majority of all the plurality of servers,
wherein the third step comprises outputting, when there is no partially matching data among the second determination results received from the majority of the plurality of servers by the second-stage determination module of the second determination module, data of a matching majority of pieces of data among pieces of data received from the plurality of servers by the first determination module, and
wherein the third step comprises acquiring, when there is no data of the matching majority of the pieces of data among the pieces of data received from the plurality of servers by the first determination module, a predetermined resolution value from one of the first determination module and the second determination module, and outputting the resolution value.

7. The data management method according to claim 6, wherein:
the plurality of servers each further comprises a third determination module configured to determine the degree of the consistency of the data through use of a Paxos algorithm; and
the third step comprises outputting, when there is no partially matching data among the second determination results received from the majority of the plurality of servers by the second-stage determination module of the second determination module, data that is based on a determination result of the third determination module.

8. The data management method according to claim 7, wherein the third step comprises inhibiting, when the third determination module is executed over a number of times set in advance within a predetermined time period, processing of the first determination module and processing of the second determination module from being executed, and storing the data output by the third determination module.

9. The data management method according to claim 6, wherein the third step comprises:
setting a priority for each of the determination result of the first determination module and the determination result of the second determination module;
discarding, when the determination result having a higher priority is successfully acquired, the determination result having a lower priority; and
guaranteeing the consistency of the data with the determination result having the higher priority.

10. The data management method according to claim 6, wherein the third step comprises:
   setting a priority for each of the determination result of the first determination module and the determination result of the second determination module; and
   guaranteeing, when the determination result having a highest priority fails to be acquired, the consistency of the data through use of the determination result having a lower priority.

* * * * *